(12) United States Patent
Rogers et al.

(10) Patent No.: US 8,002,109 B2
(45) Date of Patent: Aug. 23, 2011

(54) DRIVE ROLLER ASSEMBLY FOR TIRE CONVEYOR ASSEMBLY

(75) Inventors: Don A. Rogers, Fredericktown, OH (US); Rick A. Musick, Fredericktown, OH (US)

(73) Assignee: Unique Metal Designs, Inc., Fredericktown, OH (US)

( * ) Notice: Subject to any disclaimer, the term of this patent is extended or adjusted under 35 U.S.C. 154(b) by 0 days.

(21) Appl. No.: 12/755,614

(22) Filed: Apr. 7, 2010

(65) Prior Publication Data

US 2010/0193333 A1 Aug. 5, 2010

Related U.S. Application Data

(62) Division of application No. 12/327,864, filed on Dec. 4, 2008, now Pat. No. 7,757,840.

(60) Provisional application No. 61/074,858, filed on Jun. 23, 2008.

(51) Int. Cl.
  *B65G 23/06* (2006.01)

(52) U.S. Cl. ........................................................ 198/834

(58) Field of Classification Search ................... 198/834; 474/164

See application file for complete search history.

(56) References Cited

U.S. PATENT DOCUMENTS

| | | | | |
|---|---|---|---|---|
| 4,865,183 A * | 9/1989 | Hodlewsky et al. | ........... | 198/834 |
| 5,000,235 A * | 3/1991 | Jourdan | ........... | 141/86 |
| 5,316,522 A * | 5/1994 | Carbone et al. | ........... | 474/95 |
| 5,335,781 A * | 8/1994 | Miyagawa et al. | ........... | 198/834 |
| 6,719,127 B2 * | 4/2004 | Depaso et al. | ........... | 198/834 |
| 6,758,776 B2 * | 7/2004 | Fye et al. | ........... | 474/95 |
| 6,766,899 B1 * | 7/2004 | Guldenfels | ........... | 198/834 |
| 6,964,332 B2 * | 11/2005 | Verdigets et al. | ........... | 198/834 |
| 7,195,115 B2 * | 3/2007 | DePaso | ........... | 198/834 |
| 7,207,435 B2 * | 4/2007 | Bude et al. | ........... | 198/834 |
| 7,424,944 B2 * | 9/2008 | Mustalahti et al. | ........... | 198/321 |
| 7,556,143 B2 * | 7/2009 | Crooks | ........... | 198/779 |
| 7,604,113 B2 * | 10/2009 | Pluszynski et al. | ........... | 198/850 |
| 7,753,193 B2 * | 7/2010 | Kanaris | ........... | 198/834 |

* cited by examiner

*Primary Examiner* — Joe Dillon, Jr.
(74) *Attorney, Agent, or Firm* — Mueller Smith & Okuley, LLC

(57) ABSTRACT

A drive roller assembly for engaging a conveyor belt assembly for movement of a conveyor belt includes a sandwich assembly of components including a pair of outer annular scalloped wheels for engaging a conveyor belt for its movement, a rectilinear drive shaft running through the drive nut, and bolt assemblies to hold the sandwich assembly together.

5 Claims, 24 Drawing Sheets

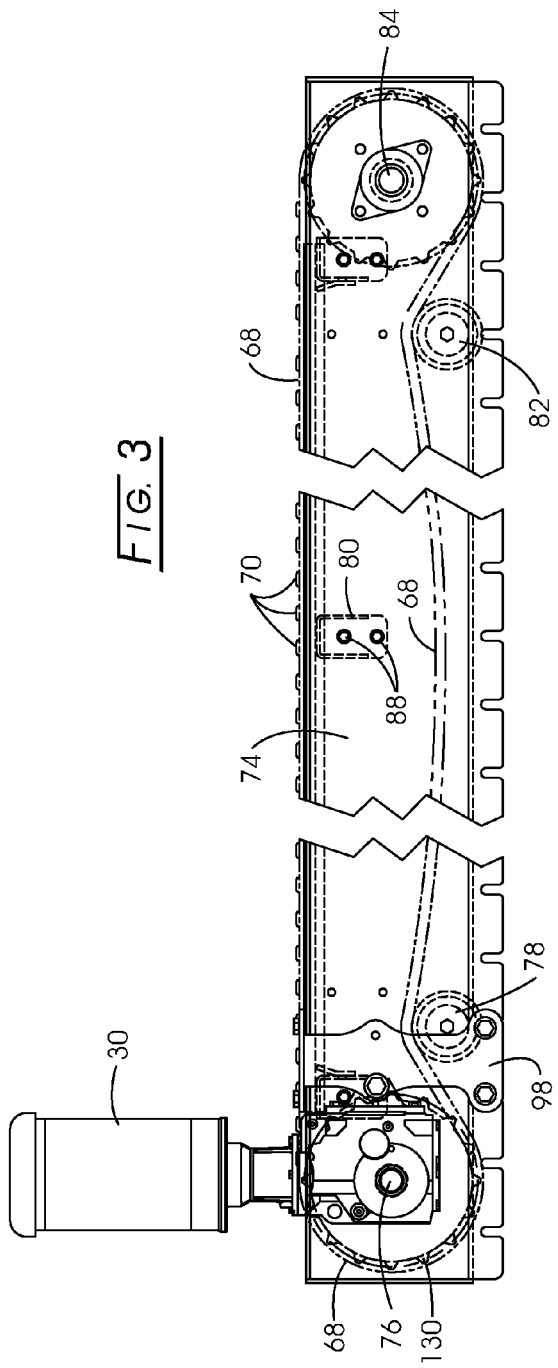
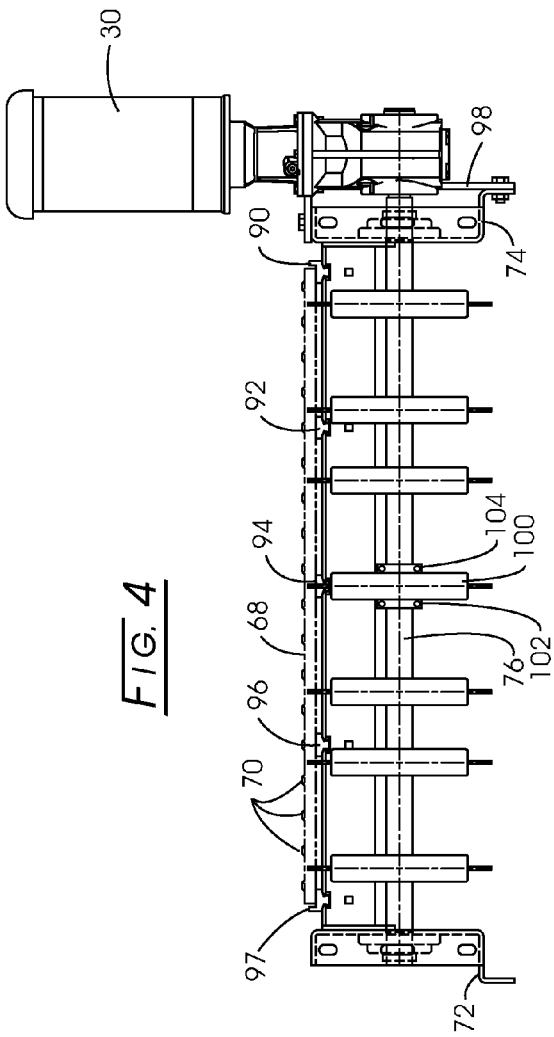

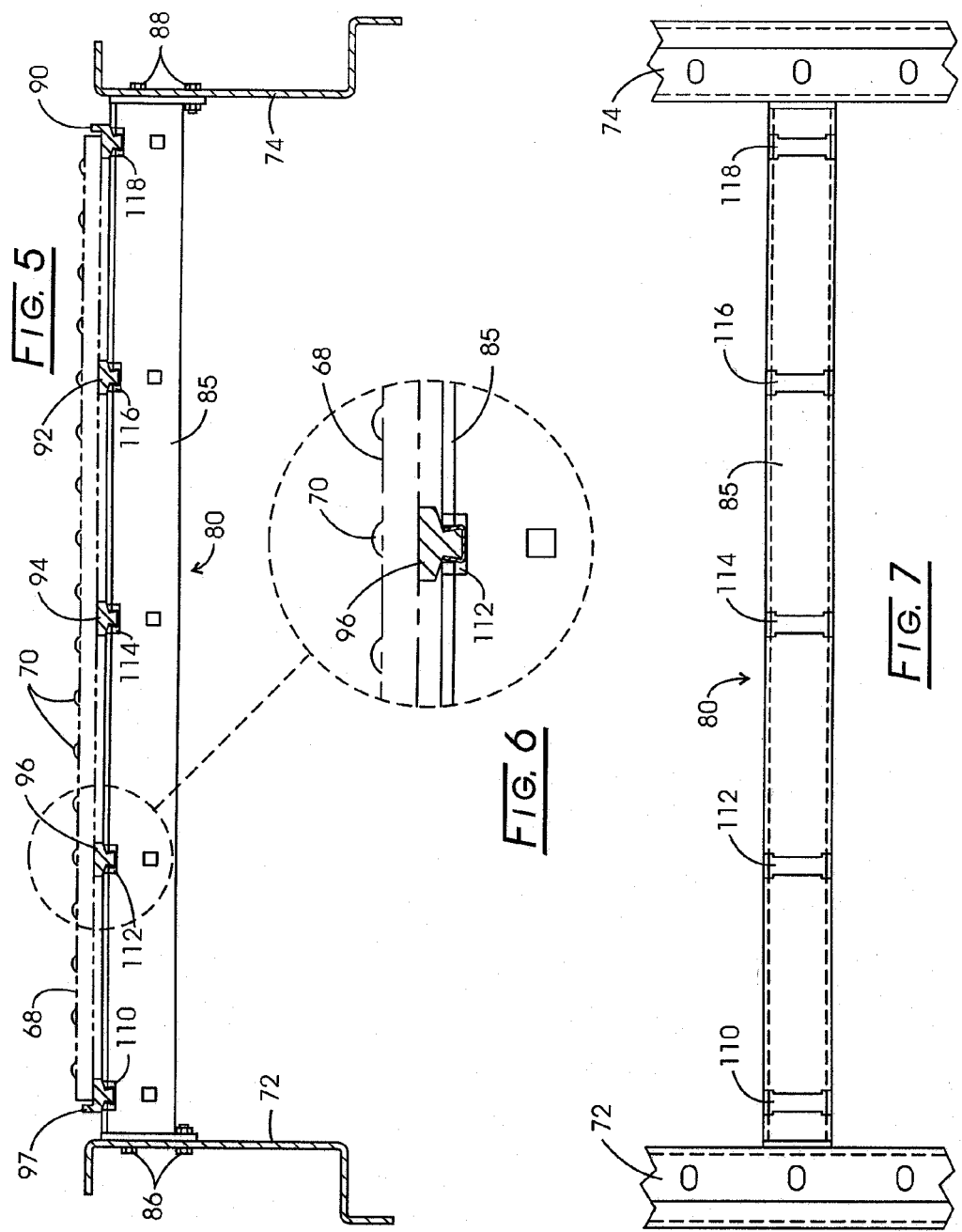

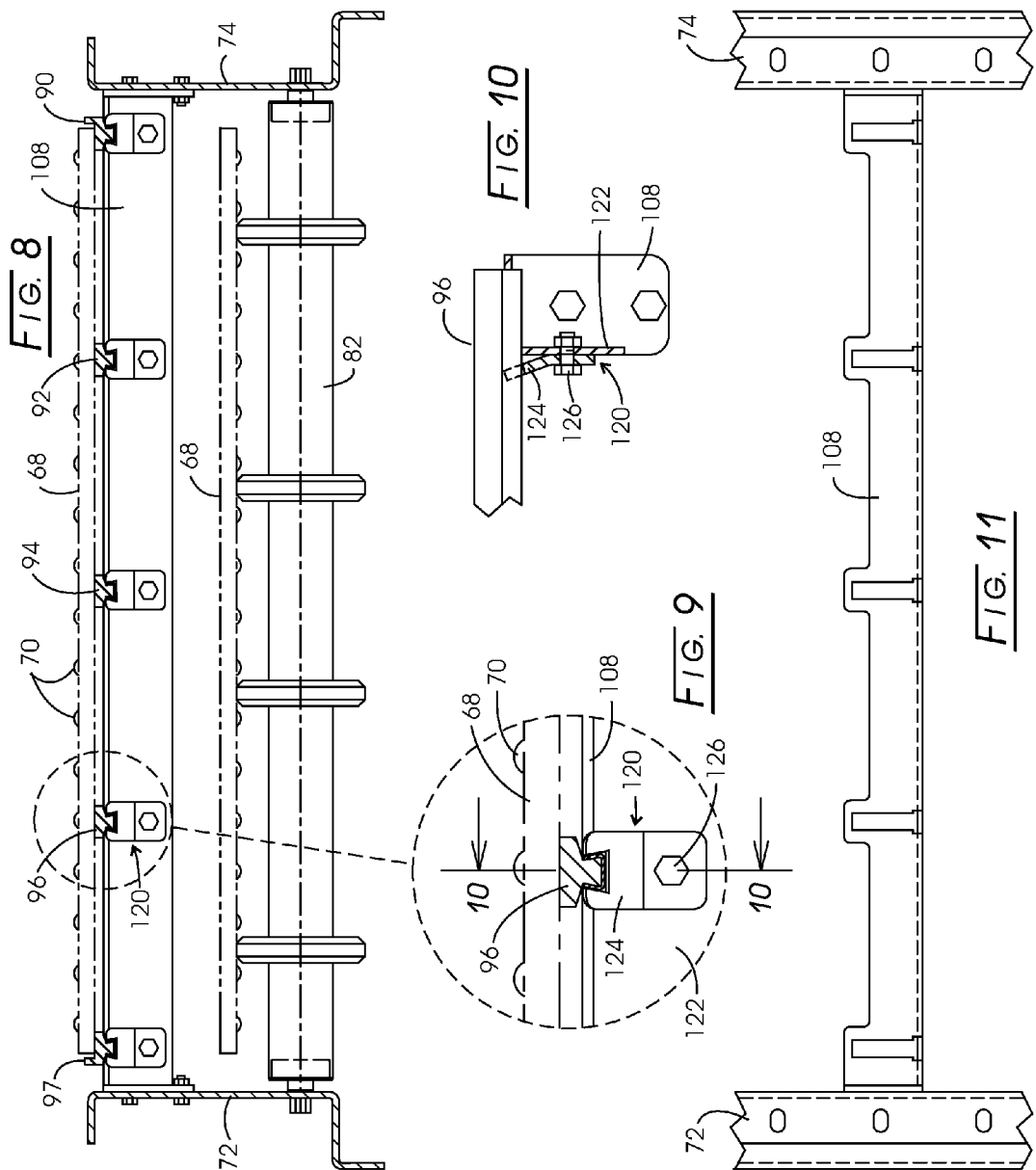

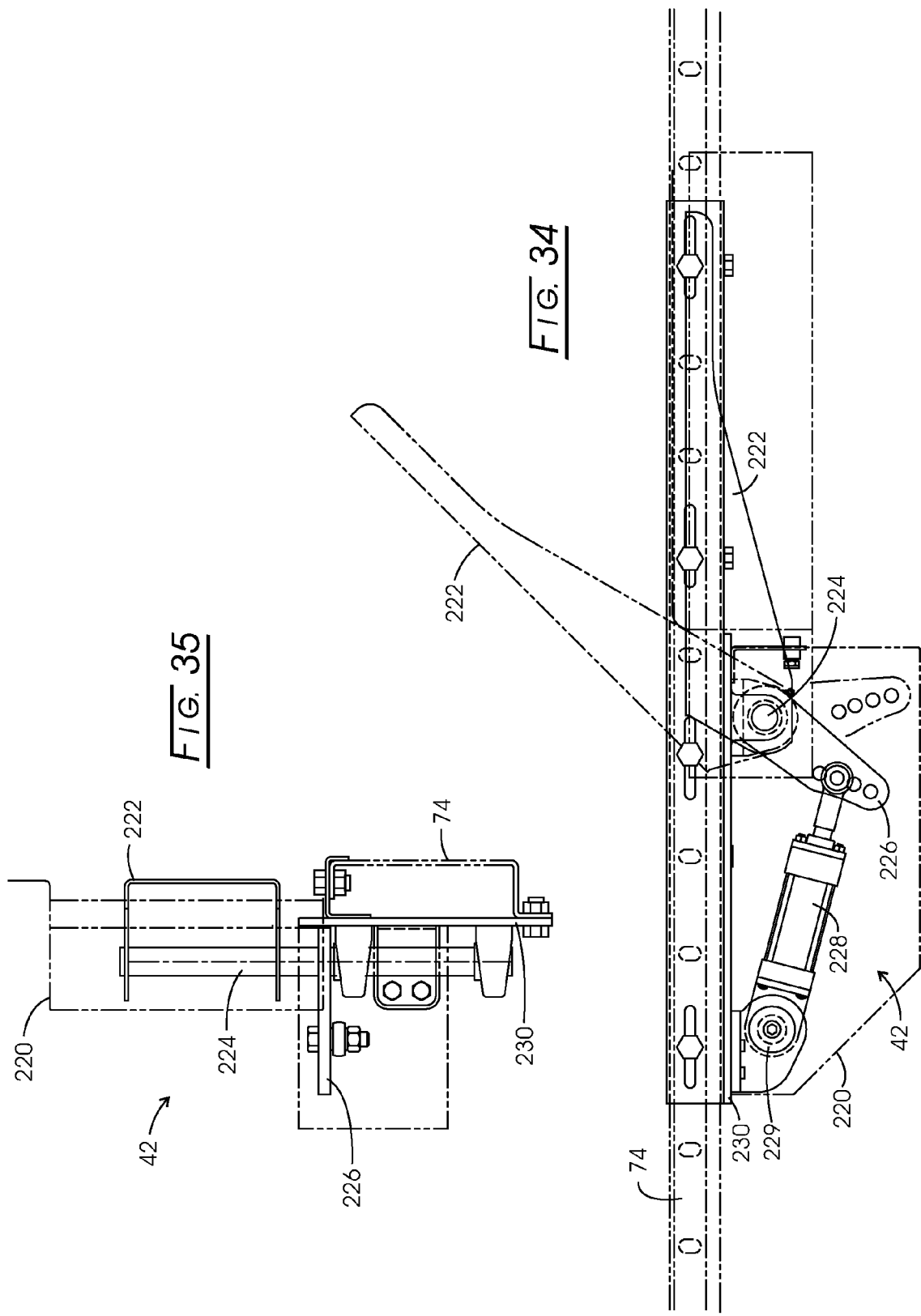

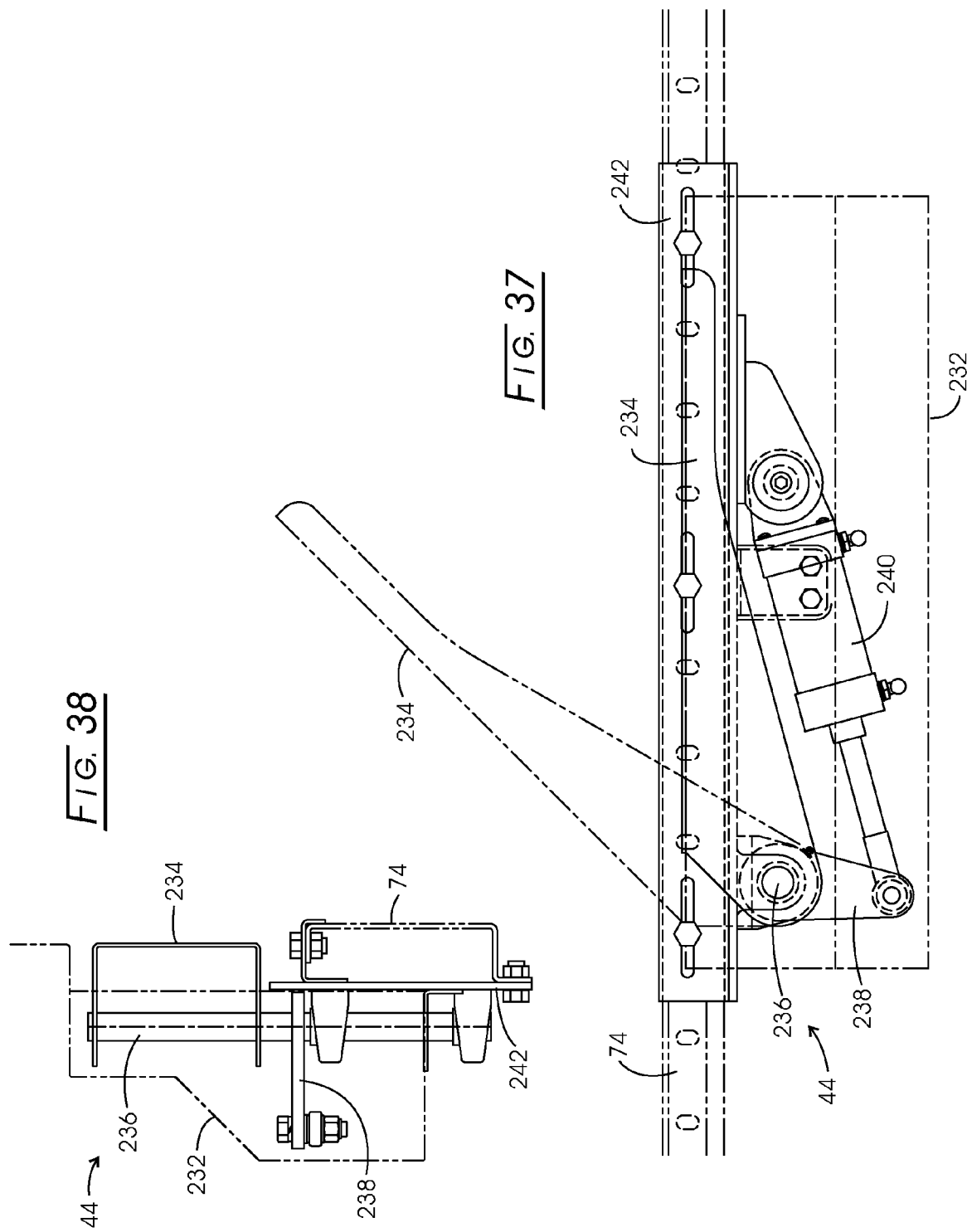

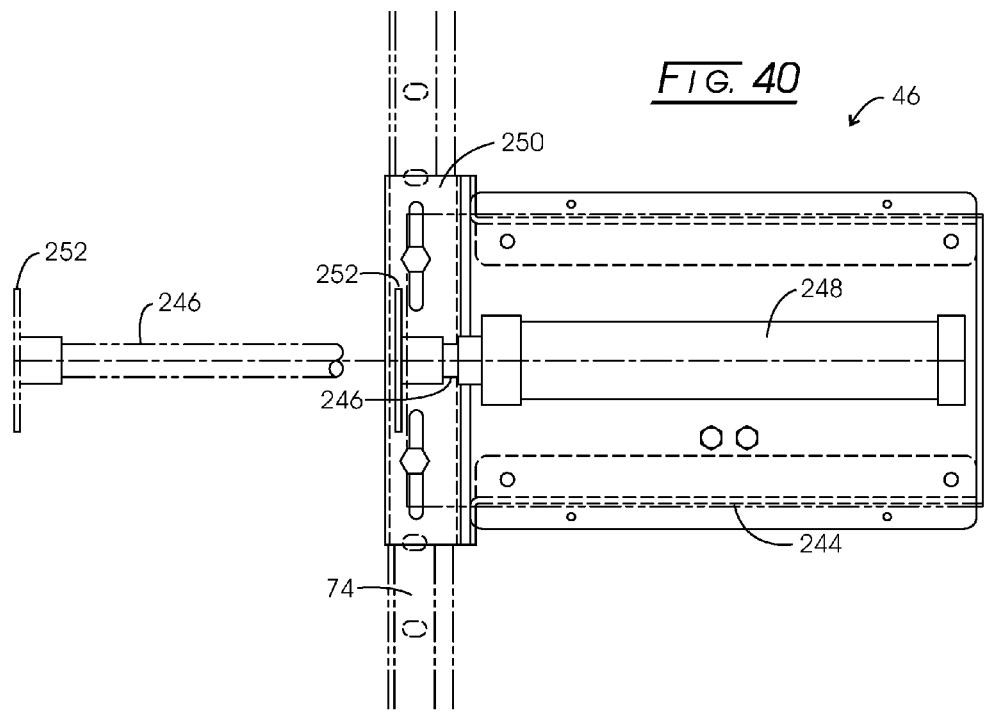
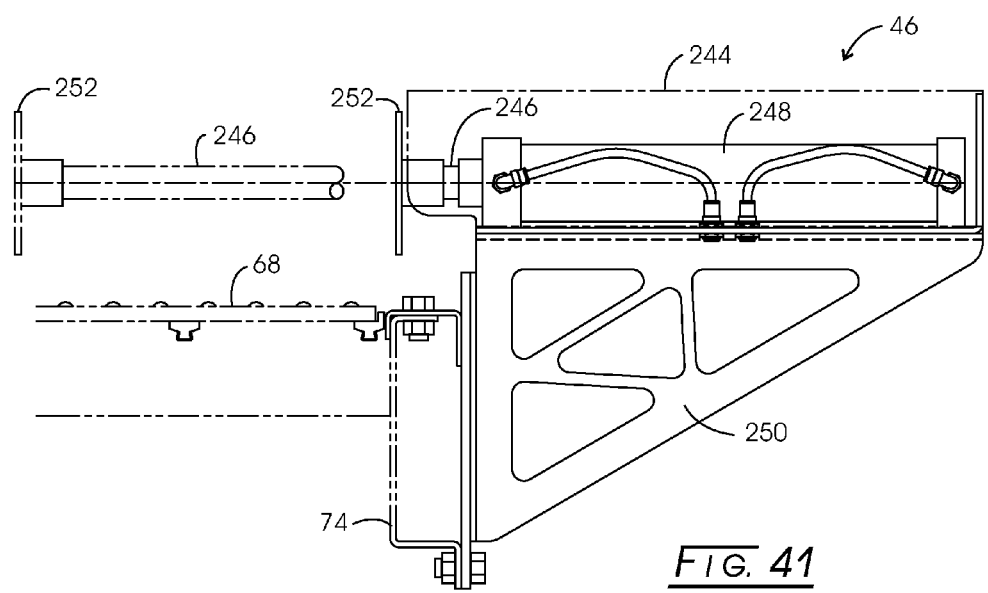

DRIVE ROLLER ASSEMBLY FOR TIRE CONVEYOR ASSEMBLY

CROSS-REFERENCE TO RELATED APPLICATIONS

This application is a division of U.S. patent application Ser. No. 12/327,864, filed Dec. 4, 2008, now U.S. Pat. No. 7,757, 840 which claims the benefit of provisional application No. 61/074,858, filed Jun. 23, 2008, the disclosure of which is expressly incorporated herein by reference.

STATEMENT REGARDING FEDERALLY SPONSORED RESEARCH

Not applicable.

BACKGROUND

The present disclosure generally relates to conveyor assemblies and more particularly to conveyor assemblies for vehicle tires.

A typical transportation mode for product, such as, for example, green and finished vehicle tires, within a plant utilizes conveyors. Conveyors can be powered or they can rely on gravity when sufficient pitch is present to keep the tires moving from a starting point to a destination.

When the operator desires to transfer a tire from current conveyor to a destination conveyor, diverters often are employed. Diverters can be of different designs and powered hydraulically, pneumatically, or electrically, as is necessary, desirable, or convenient.

Frames carrying the conveyor belt carry the diverters. Ease of assembly and life expectancy are important to operators, as is ease of manufacturing to the manufacturer. Important too are value guides, rollers, and other conveyor supporting equipment for minimizing noise, vibration, longevity, and the like.

It is to all of these conveyor components that the present disclosure is directed.

BRIEF SUMMARY

One aspect of the present disclosure is an improved conveyor assembly including a conveyor belt for conveying a product to one or more product operations is disclosed. Such conveyor assembly includes a pair of spaced apart side frames that support the conveyor belt and between which the conveyor belt rotates. The side frames are formed from an upstanding member and a inwardly extending horizontal member. Both the frame upstanding member and the frame horizontal member carry a series of elongated slots. One or more L-shaped brackets are formed from a generally upstanding member and an inwardly extending member. Both the bracket upstanding member and the bracket horizontal member carry a series of elongated slots. The bracket horizontal member slots are configured to overlay the frame elongate horizontal member slots, and the bracket upstanding member slots are configured to overlay the frame upstanding member slots for attaching components to the frames.

Another aspect of this disclosure is a diverter in association with a product primary conveyor apparatus for changing direction of travel of a product being carried by the primary conveyor apparatus to a side conveyor apparatus. The diverter includes a side frame supporting the primary conveyor apparatus and a diverter affixed to the side frame and which includes a piston assembly affixed to the side frame; a pivot arm pivotally affixed to the side frame and to the piston assembly with an elastomeric component; and a paddle affixed to the piston assembly and being actuatable to contact a tire being carried by the primary conveyor onto a side conveyor disposed opposite the diver.

A wear bar assembly for a conveyor assembly forms yet a further aspect of the present disclosure. This assembly includes a holder spanning underneath a conveyor belt and between a pair of side frames between which the conveyor passes. The holder contains a series of transverse slots having an opening and a bottom, where the opening is smaller than bottom. A series of wear strips are configured to match the shape of the holder slots. End clips are carried by the side frames and retain the wear bar assembly in place.

These and other aspects of the present disclosure are delineated in greater detail below.

BRIEF DESCRIPTION OF THE DRAWINGS

For a fuller understanding of the nature and advantages of the present assembly and components thereof, reference should be had to the following detailed description taken in connection with the accompanying drawings, in which:

FIG. 3 is a side elevational view of the conveyor depicted in FIG. 2, again with the side frame broken away to reveal interior components of the conveyor;

FIG. 4 is an end view of the conveyor depicted in FIGS. 2 and 3;

FIG. 5 is a view taken along line 5-5 of FIG. 2;

FIG. 6 is an enlarged view of the indicated transverse slide bar assembly in FIG. 5;

FIG. 7 is an overhead view of the transverse guide bar assemblies and frame showed in FIG. 5;

FIG. 8 is a view taken along line 8-8 of FIG. 2 showing the ultimate transverse guide bar assembly;

FIG. 9 is an enlarged view of the guide bar assembly locking mechanism;

FIG. 10 is a view taken along line 10-10 of FIG. 9;

FIG. 11 is an overhead view of the transverse terminal guide bar assembly and frame shown in FIG. 10;

FIG. 34 is an overhead view of the stager assembly of FIG. 31;

FIG. 35 an end view of the stager assembly of FIG. 34;

FIG. 37 is a plan view of the second diverter assembly shown in FIG. 1;

FIG. 38 is an end view of the second diverter assembly of FIG. 37;

FIG. 40 is a plan view of the third diverter assembly shown in FIG. 1;

FIG. 41 is an end view of the third diverter assembly of FIG. 40;

The drawings will be described in further detail below.

DETAILED DESCRIPTION

Figure 1:
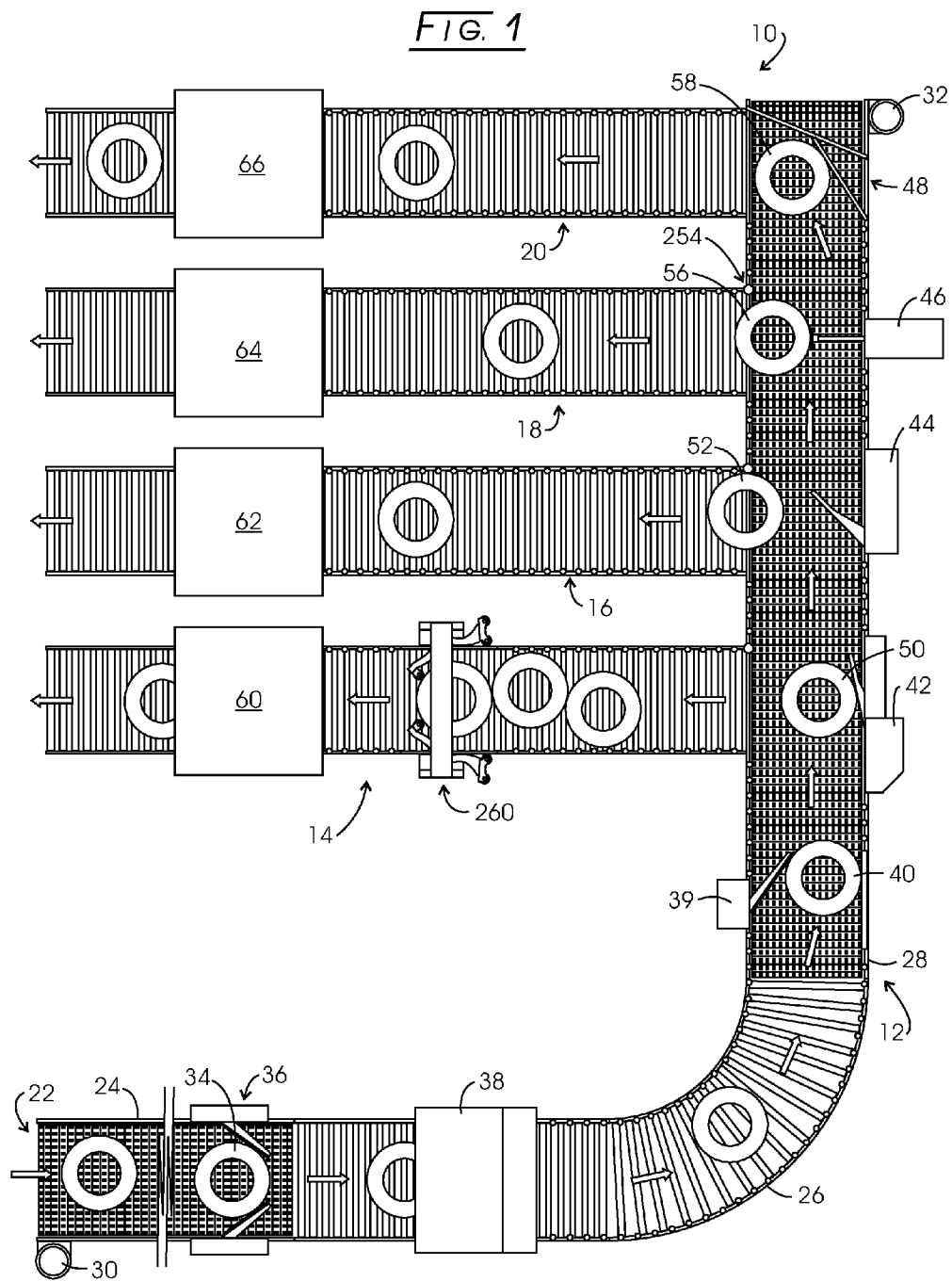
FIG. 1 is an overhead view of a tire assembly conveyor line that utilizes the various components disclosed herein.

The tire conveyor assembly shown in FIG. 1 merely illustrates the various components of the conveyor assembly and is not a limitation of the disclosure set forth herein. Rather, FIG. 1 illustrates the flexibility of the disclosed conveyor assembly. Moreover, the arrangement of the components that comprise the conveyor assembly likewise is merely illustrative in that many other configurations can be envisioned based on the present disclosure. Also, the conveyor assembly will be described with specific reference to unmounted vehicle tires, but the conveyor assembly also is useful for wheel mounted tires, green tires, cardboard boxes, and a variety of other products.

Referring specifically to FIG. 1, a tire conveyor assembly, 10, is composed generally of a main conveyor assembly, 12, and four side conveyor assemblies, 14, 16, 18, and 20. The lengths of each such conveyor assemblies can be varied greatly, as can the number of side conveyors, location and arrangement of side conveyors, etc.

Conveyor assembly 12 has a feed end, 22, whereat tires enter tire conveyor assembly 10. While the tires can be mounted on wheels, tire conveyor assembly 10 as shown is intended to operate with unmounted tires. Conveyor assembly 12 is composed of a first driven conveyor assembly, 24, a gravity driven roller assembly, 26, and a second driven conveyor assembly, 28. First driven conveyor assembly 24 is driven by a hydraulic motor, 30, and second driven conveyor assembly 28 is driven by a hydraulic motor, 32. While all power is supply by hydraulic lines herein, it will be appreciated by the skilled artisan that pneumatic, electric, or other motive means could be used in place of and/or in combination with the hydraulic power illustrated in the drawings.

A tire on powered conveyor 24, such as a representative tire, 34, initially encounters a centering assembly, 36, that centers tire on conveyor assembly 24. The tire next encounters gravity fed roller assembly 26 where the tire enters into a tire rotator and bar code reader assembly, 38, which captures the tire and rotates the tire so that a bar code reader can read the bar code that was placed on the tire bead. The information gleaned by the bar code reader is used to determine the route that the tire will take and the operations that will be performed on the tire during its course through tire conveyor assembly 10.

The tire emergences from tire rotator and bar code reader assembly 38 and continues its gravity driven travel down roller assembly 26 and onto powered conveyor assembly 28 whereat the tire is confronted by a tire stager assembly, 39. Stager assembly 39 urges the tire, such as a tire, 40, to the far side of conveyor assembly 28 and up against the far side of the conveyor. The reason for this operation will become apparent below.

Next, tire 40 can be diverted onto one of four side tire conveyor assemblies, 14, 16, 18, and 20. Tire 40 will be diverted onto one of these side conveyors depending up what operation yet need to be performed on the tire, which, as discussed above, is a function of the bar code on the tire. Mounted to the side opposite the side where the four side conveyors are located along powered conveyor 28 are four diverter assemblies, 42, 44, 46, and 48. All of the diverters are powered except for diverter assembly 48.

First diverter assembly 42 can be actuated to push a tire, 50, onto gravity roller conveyor assembly 14. Second diverter assembly 44 can be actuated to push a tire, 52, onto gravity roller conveyor assembly 16. Third diverter assembly 44 can be actuated to push a tire, 56, onto gravity roller conveyor assembly 18. Finally, a tire, 58, bumps into roller diverter assembly 48 and is shunted onto gravity roller assembly 20.

Operation assemblies, 60, 62, 64, and 66, can be one or more of a grinder, a stacker, an inspection station, an elevator, or the like. Any number of operations can be performed on a tire in addition to those operations recited herein.

Figure 1A:
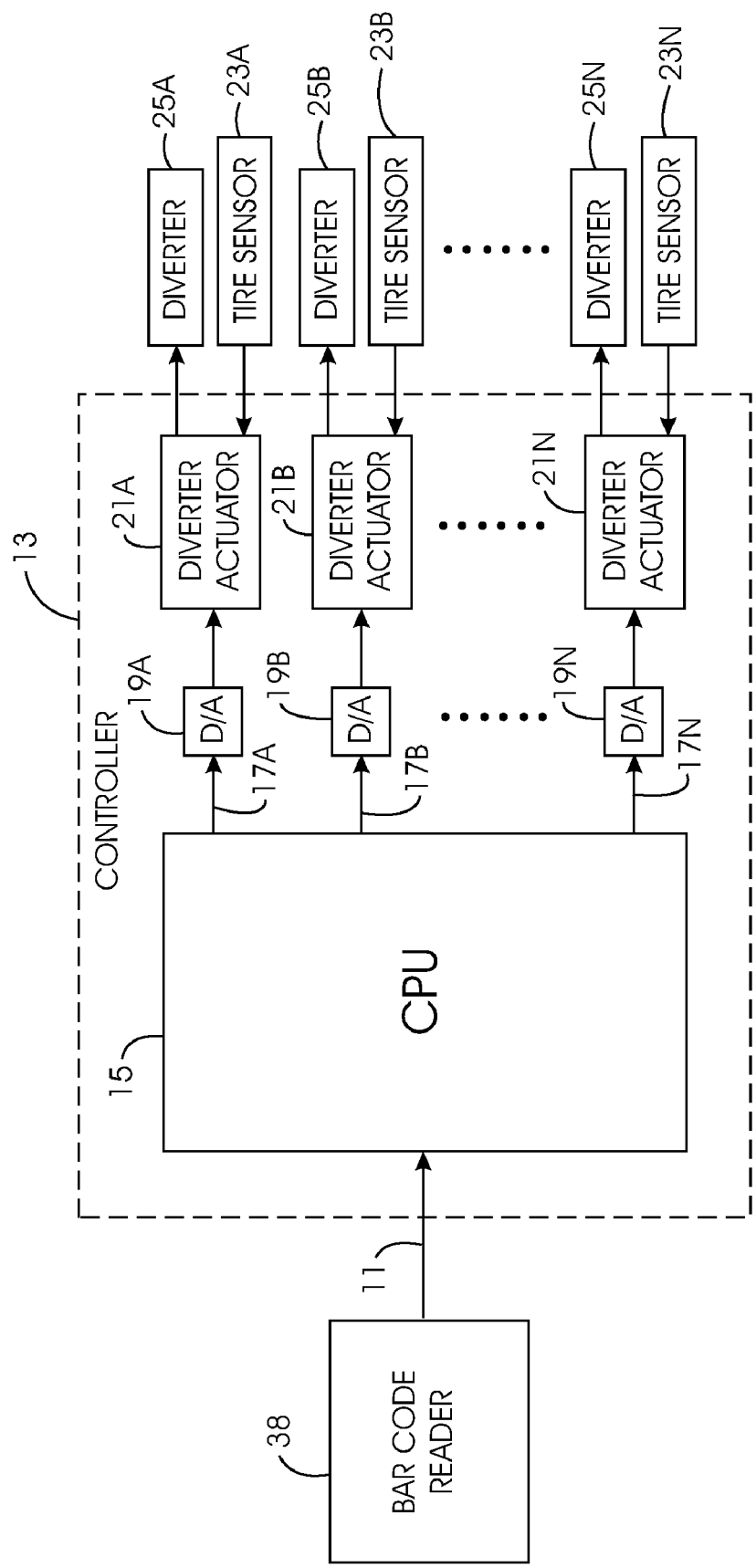
FIG. 1A is a block diagram of a control sequence of the tire assembly conveyor line of FIG. 1.

While many schemes can be envisioned for control of tire conveyor assembly 10, one representative control sequence is illustrated in FIG. 1A where the bar code reader output, 11, from tire rotator and bar code reader 38 is inputted into a controller, 13, which may contain a central processor unit (CPU) or computer, 15. Outputs, 17A, 17B, and 17N for N outputs from CPU 15 may be required to be passed through digital to analog converters (D/A), 19A, 19B, and 19N, for the N outputs. Analog outputs from the D/A converters are fed to diverter actuators, 21A, 21B, and 21N, along with tire sensor data, 23A, 23B, and 23N, which alert the actuator that a tire is in position, at which time each diverter actuator sends a signal to the diverters, 25A, 25B, and 25N, to actuate and divert a tire onto a side conveyor assembly. N can be any number, provided that the CPU is capable to N outputs.

Figure 2:
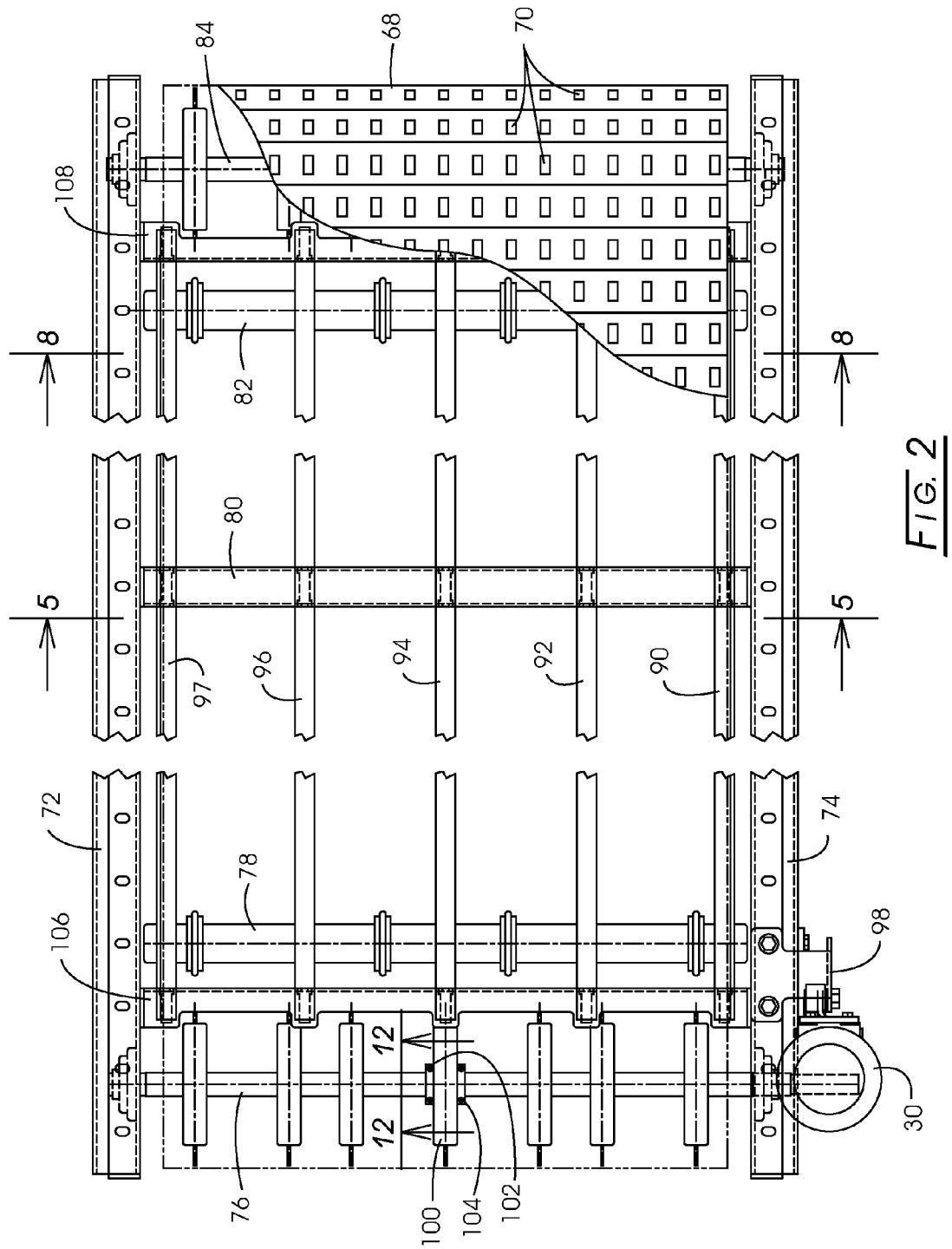
FIG. 2 is an overhead view of a typical conveyor used in the assembly line with the conveyor belt broken away to reveal the interior assembly of the conveyor.
Figure 12:
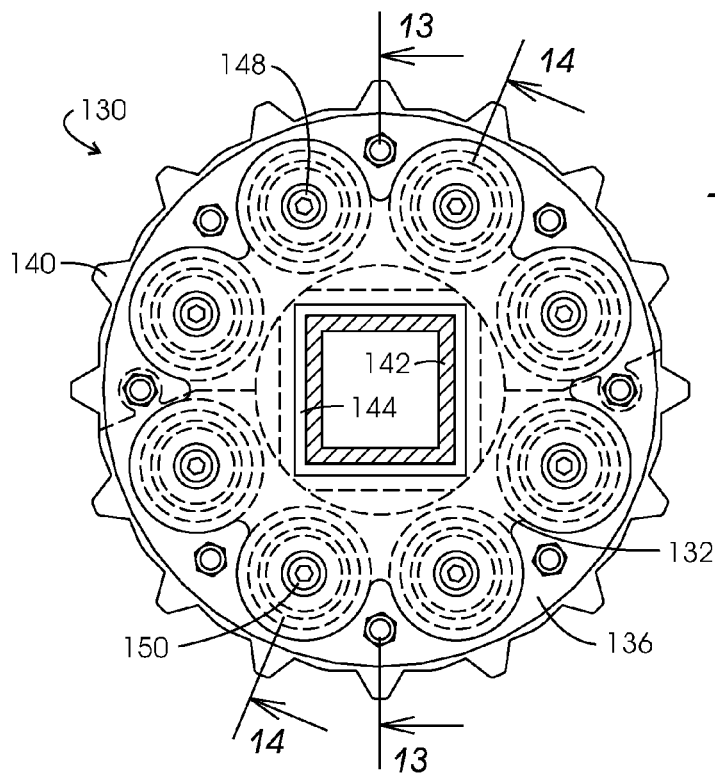
FIG. 12 is a view taken along line 12-12 of FIG. 2.

Referring to FIG. 2 relating to the powered conveyor assemblies, a belt, 68, moves along the longitudinal extent of each powered conveyor assembly 24 and 28. Additionally, belt 68 contains a myriad of small rollers mounted transverse to the direction of travel of belt 68, such as a representative roller, 70. Roller 70 permits tires to be pushed in a direction transverse to the direction of travel of belt 68 with the tire being easily movable as it moves along roller 70 and the other transverse mounted small rollers. Side frames, 72 and 74, run the entire length of the power conveyor assemblies and are unique in structure and function, as will be revealed in greater detail later herein.

At the left side of FIG. 2 is the end of the powered conveyor assembly shown thereat, such as feed end 22 of powered conveyor assembly 24. In particular, drive motor 30 is shown affixed to a drive roller assembly, 76, which spans between and is retained by side frames 72 and 74. Also spanning between side frames 72 and 74 a conveyor belt return roller assembly, 78, and a wear bar assembly, 80, and upon which belt 68 rests as it travels. On the return end is a conveyor belt return roller assembly, 82, and an end return roller assembly, 84, about which belt 68 wraps.

In the side view shown in FIG. 3, side frame 74 is seen along with drive roller assembly 76, return roller assembly 84, belt return rollers 78 and 82, and wear bar assembly 80. In FIG. 4, drive roller assembly 76 is connected to drive motor 30 and spanning between side frames 72 and 76. Side frames 72 and 74 are seen to include a lower section carrying a number of vertically oriented slots and an inwardly extending flange having a series of slots (see FIG. 2). Thus, various components can be affixed to and carried by side frames 72 and 76 using both of these series of slots.

In particular, a series of apertures have been formed in side frames 72 and 74 and through which the ends of roller assemblies 76, 78, 80 and 82 can be placed for their retention. Wear bar assembly 80 is seen retained in place by bolts, 86 and 88, which are placed in the apertures of side frames 72 and 76 (see FIG. 5). A number of such wear bar assemblies span between side frames 72 and 76 in order to support a series of longitudinally extending wear strips, 90, 92, 94, 96, and 97 (see FIG. 2) which in turn support belt 68 (see FIG. 5).

In FIG. 3, motor assembly 30 is affixed to side frame 74 by an angle bracket, 98, which is bolted to side frame 74. Motor 30 provides direct drive to power roller assembly 76 in the configuration illustrated; although, use of a belt drive, chain drive, or other power transmission assembly could be used. A central drive roller, 100, is seen held in position on drive roller 76 by a pair of clips, 102 and 104, while the other rollers "float" or are permitted to travel along the extent of roller 76 responsive to loads placed atop belt 68.

Side frames 72 and 74 are shown in side profile in FIG. 5 and plan view in FIG. 7 with wear or slide bar assembly 80 bolted onto each of such side frames. Wear strip 96 is seen in the expanded view in FIG. 6 to fit within a trapezoidally-shaped recess in holder 85 to form a "mortise and tenon" locking mechanism that keeps wear strip 96, and the other wear strips, in place supporting belt 68 upon which belt 68 moves. It will also be seen that end wear strips 90 and 97 have upwardly extending flanges to help keep belt 68 in place. The wear bars terminate in terminal wear bar assemblies, 106 and 108 (see FIG. 2). The slots, 110, 112, 114, 116, and 118, formed in slide bar assembly 80 and which carry wear strips 90, 92, 94, 96, and 97, are seen in FIG. 7. From FIG. 3, holder 85 is seen to be an upside down "U" in configuration.

In FIG. 8, end wear bar assembly 108 is seen in greater detail. Retention of the wear strip ends is seen in the expanded view in FIGS. 9 and 10 specifically for slide bar 96, but such retention is typical for all of the slide bars. Such retention includes a clip assembly, 120, that includes a flat plate, 122, and a notched angle plate, 124, held together by bolt assembly, 126, that is associated with a retention bar, 128 (see FIG. 11). Notched angle plate 124 retains slide bar 96 within its notch. Tightening of bolt assembly 126 causes notched angle plate 124 to rotate against slide bar 96 in a cam-like action to firmly retain it. The simplicity of action of clip assembly 120 makes it easy to install the wear bars during initial installation, adjust the tension of clip assembly 120 during operation, and replace the wear bars when required.

Figure 13:
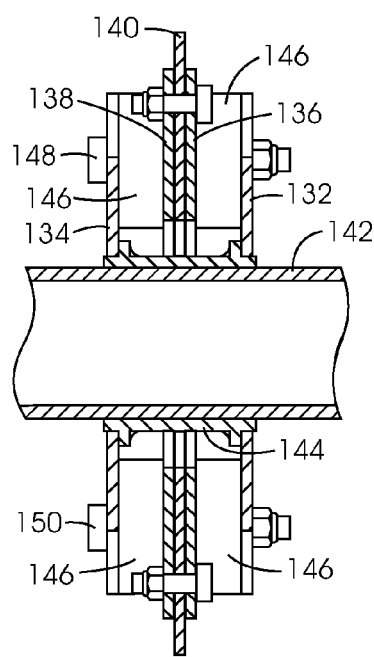
FIG. 13 is a view taken along line 13-13 of FIG. 12.
Figure 14:
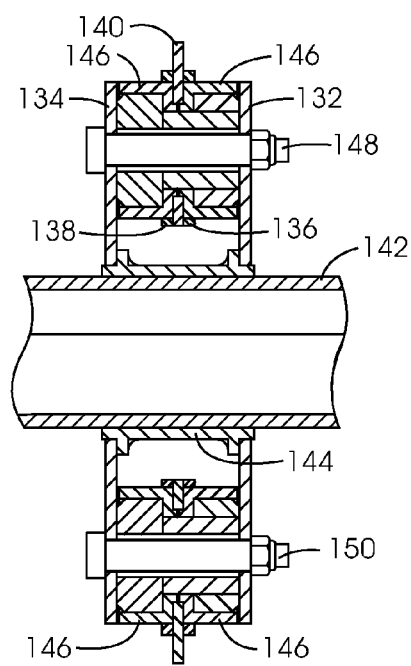
FIG. 14 is a view taken along line 14-14 of FIG. 12.
Figure 18:
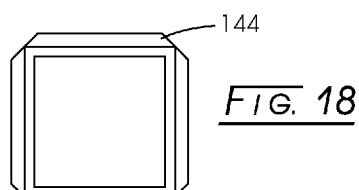
FIG. 18 is a plan view of a drive nut in the drive plate assembly of FIG. 12.
Figure 19:
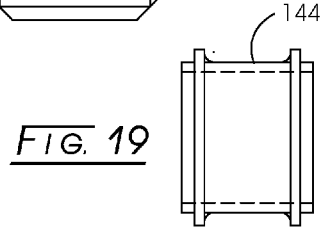
FIG. 19 is a side view of a drive nut of FIG. 18.
Figure 15:
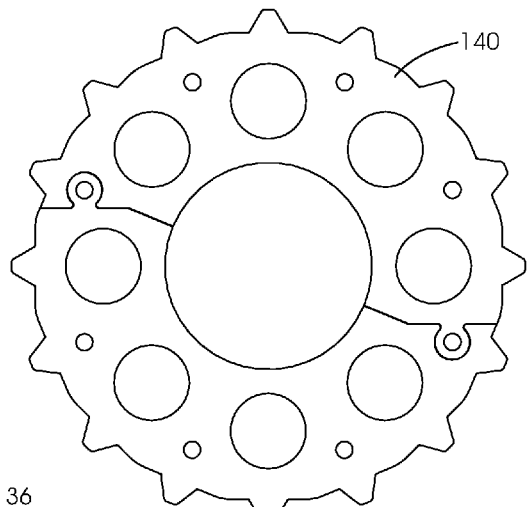
FIG. 15 is a side view of the drive plate in the drive plate assembly of FIG. 12.
Figure 16:
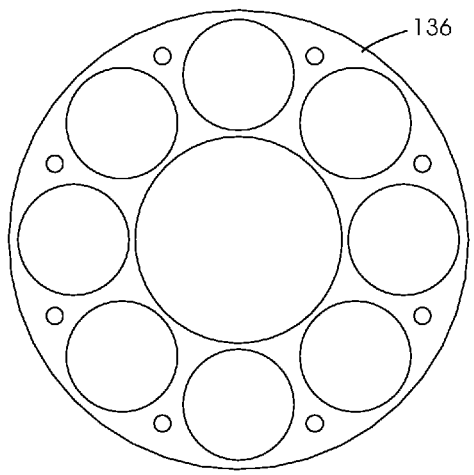
FIG. 16 is a side view of the drive plate holder plates in the drive plate assembly of FIG. 12.
Figure 20:
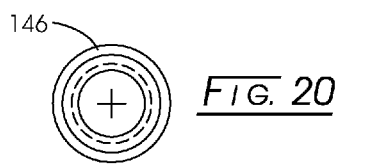
FIG. 20 is a plan view of a drive cup in the drive plate assembly of FIG. 12.
Figure 21:
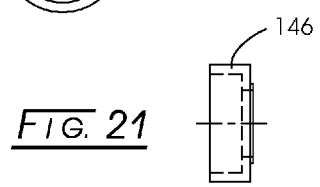
FIG. 21 is a side view of a drive cup of FIG. 20.
Figure 17:
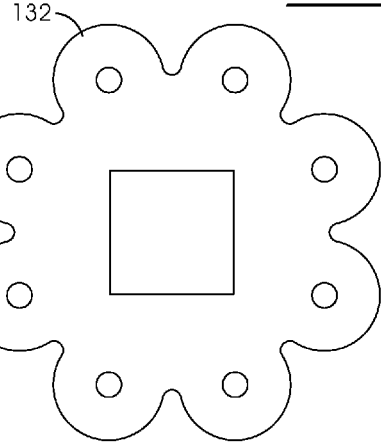
FIG. 17 is a side view of the outer plate in the drive plate assembly of FIG. 12.

Returning to FIG. 3, drive roller assembly 76 includes a toothed drive wheel assembly, 130, that engages belt 68. Toothed drive wheel assembly 130 is seen in greater detail in FIGS. 12-21 to include a pair of out outer scalloped wheels, 132 and 134 (see FIG. 17), a pair of inner apertured plates, 136 and 138 (see FIG. 16), a central split drive wheel, 140 (see FIG. 15), a drive shaft, 142, a central drive nut, 144 (see FIGS. 18 and 19), and sixteen drive cups as represented by a drive cup, 146 (see FIGS. 20 and 21). Each of wheels 132-140 is a central aperture in which drive nut 144 is disposed. The aperture in drive nut 144 is square in shape to accommodate square drive shaft 142. The scallops of scalloped wheels 132 and 134 retain drive cup 146 and the other drive cups therebetween. The entire sandwich assembly is secured by eight nut and bolt assemblies, such as typified by nut and bolt assemblies, 148 and 150 (see FIG. 13). While 16 drive cups and 8 bolt assemblies have been illustrated, obviously a greater or lesser number can be provided, as is necessary, desirable, or convenient.

Figure 22:
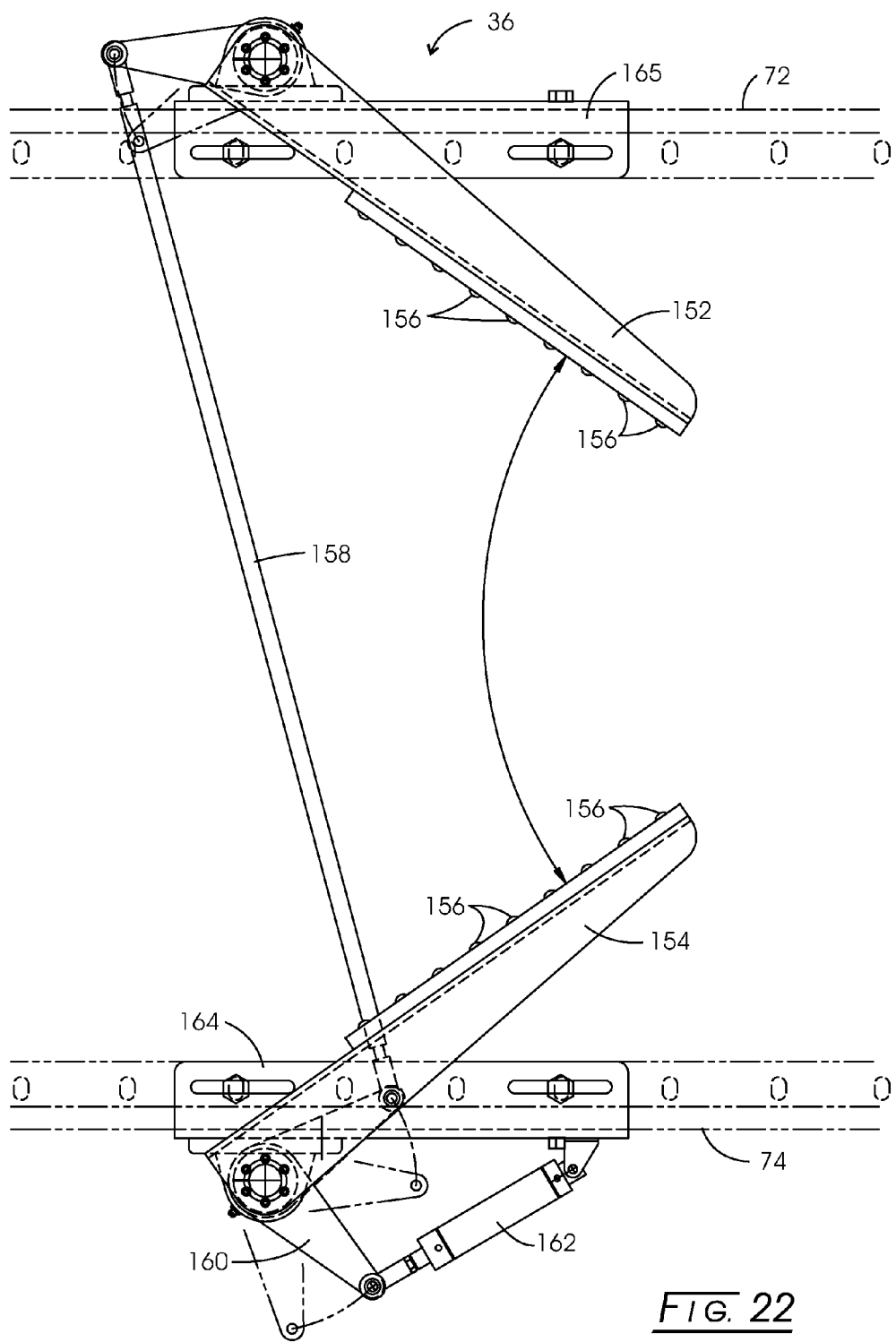
FIG. 22 is an overhead view of the centering apparatus shown in FIG. 1.
Figure 23:
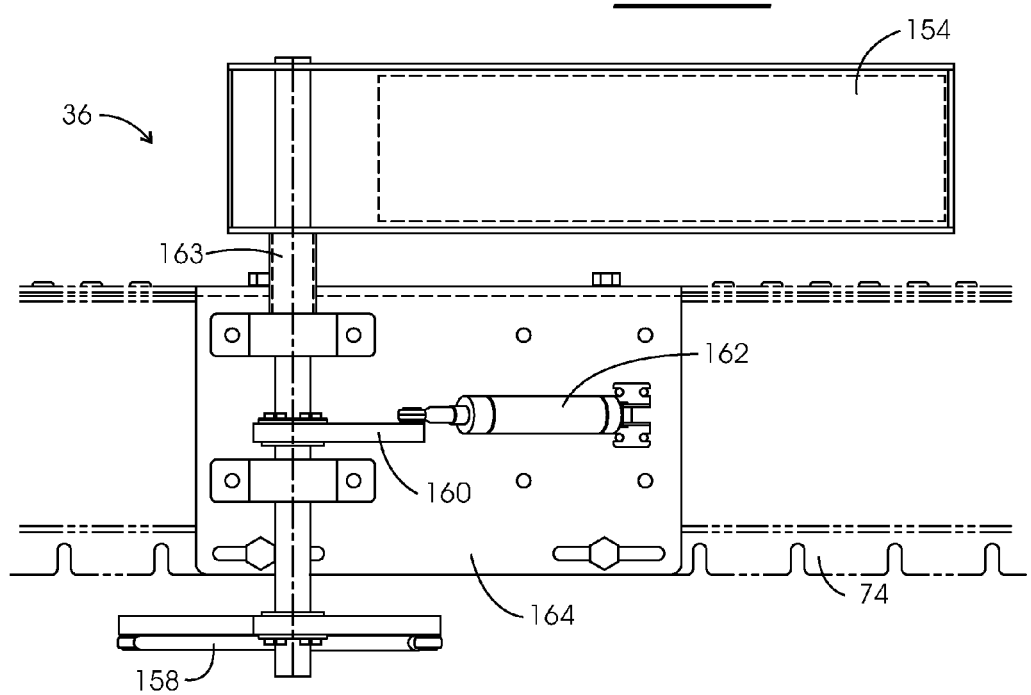
FIG. 23 is a side view of the centering apparatus of FIG. 22.
Figure 24:
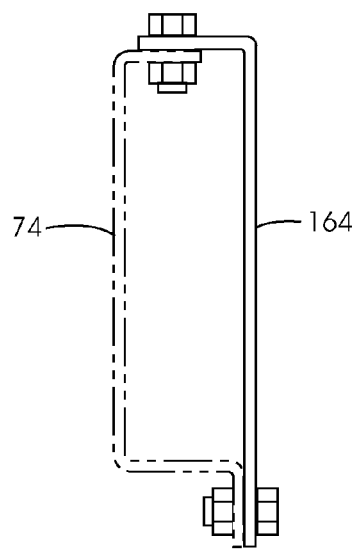
FIG. 24 is an end view of the frame (in phantom) and bracket that attaches the centering apparatus of FIG. 22 to the frame.

Returning again to FIG. 1, centering assembly 36 is illustrated in greater detail in FIGS. 22-24. In particular centering assembly 36 is seen to include a pair of paddles, 152 and 154, whose inside faces contain a series of small rollers, such as a typical roller, 156, to facilitate smooth contact between the paddles and tire 34 as they make contact. A pivot bar, 158, interconnects paddles 152 and 154 and is disposed beneath the conveyor assembly. Pivot bar 158 is pivotally connected to a paddle 156, via a drive rod (not shown). Pivot bar 158 also is pivotally connected to a swing arm, 160. Swing arm 160 also is connected to a hydraulic piston assembly, 162, via another drive rod, 163 (see FIG. 23). Piston assembly 162 in turn is connected to side frame 74 by a bracket, 164 (see FIGS. 23 and 24), through the slots provided along the top and sides of frame 74 (see FIGS. 23 and 24). Such slots in side frame 74 permits centering assembly 36 to be located at any point along the conveyor assembly and to be re-located at any time in the future easily and quickly. Paddle assembly 152 is affixed to frame 72 by a bracket, 165. Alignment of paddles 154 and 152, is facile since brackets 164 and 165 can be adjusted along the extend of their respective rails 72 and 74, in part due to the slots of rails 72 and 74, and the slots of brackets 164 and 165.

Paddle 154, then, is a driven or powered paddle, while paddle 152 is a slave paddle. The angle between the out tips of paddles 154 and 156 can be mechanically adjusted to accommodate the size of tires to be handled at any given time during operation and the resistance pressure required provided by paddles 152 and 154 against tire 34 can be adjusted by the pressure maintained in piston assembly 162. Tire 34 will be moved to the center of belt 68 by paddles 152 and 154 with the rollers facilitating smooth movement of tire 34. Once tire 34 reaches the center between paddles 152 and 154, tire 34 will be pulled through the paddles by belt 68 and the slight opening of paddles 154 and 156. Tire 34 and other tires on the belt 68 now are centered when they enter the next stage, which in FIG. 1 is tire rotator and bar code reader 38. Of course, other Operation assemblies, such as typified by operations assemblies 60, 62, 64, and 66, could follow centering assembly 36.

Figure 25:
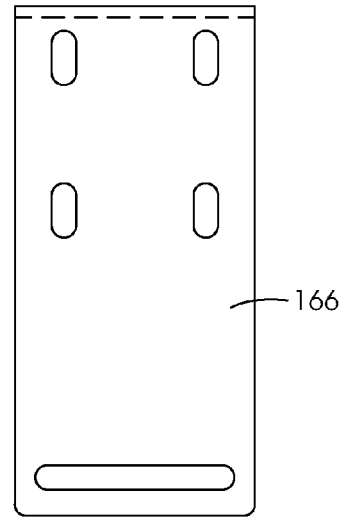
FIG. 25 is a side view of a universal bracket used to affix various items to the side bar or frame of the conveyor assembly.

A universal bracket, 166, is illustrated in FIG. 25, which can be used to affix a variety of components to the side frames. Bracket 166 will be so illustrated later in the instant description.

Figure 26:
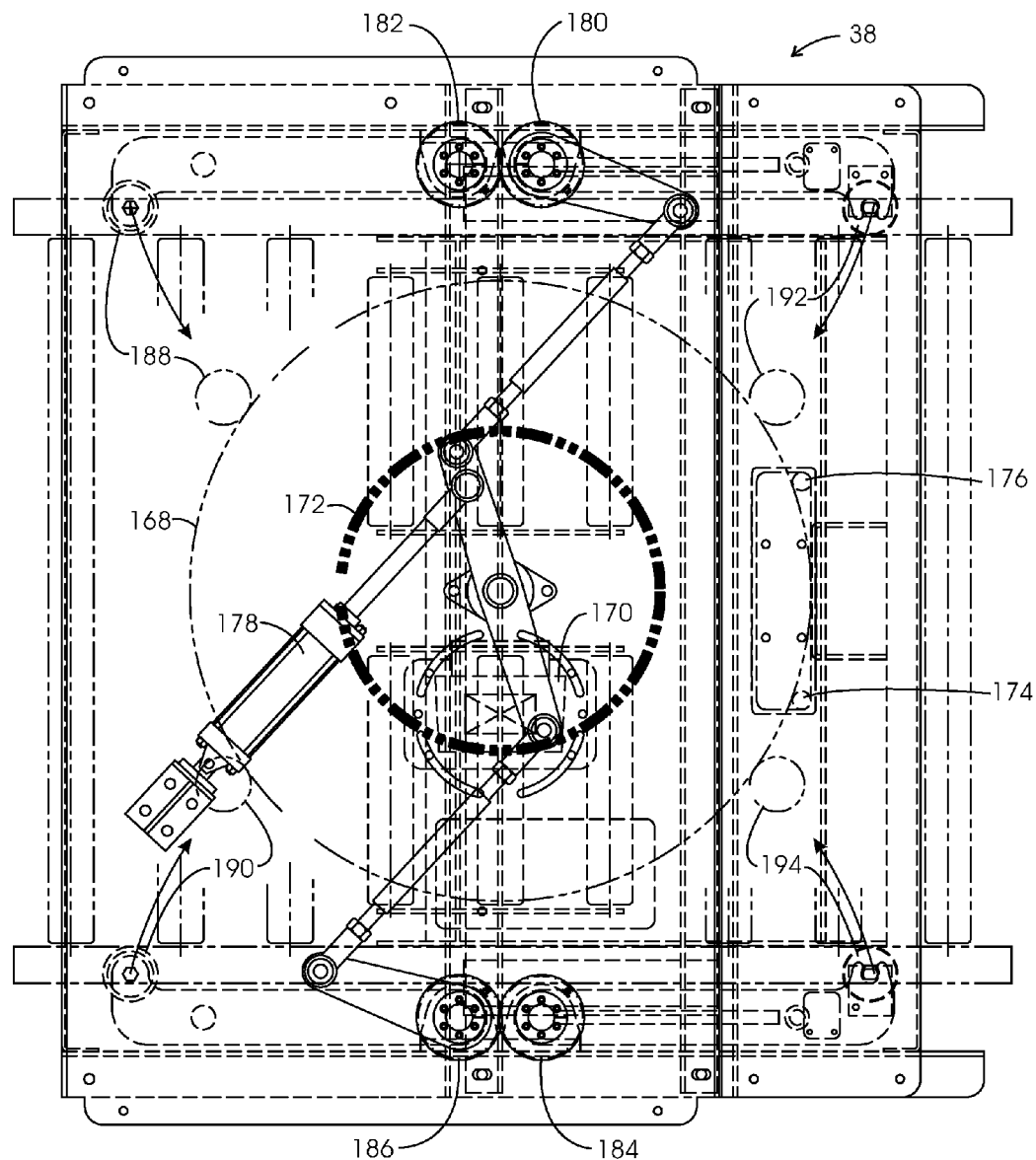
FIG. 26 is an overhead or plan view of the tire rotator and bar code reader assembly shown in FIG. 1.
Figure 27:
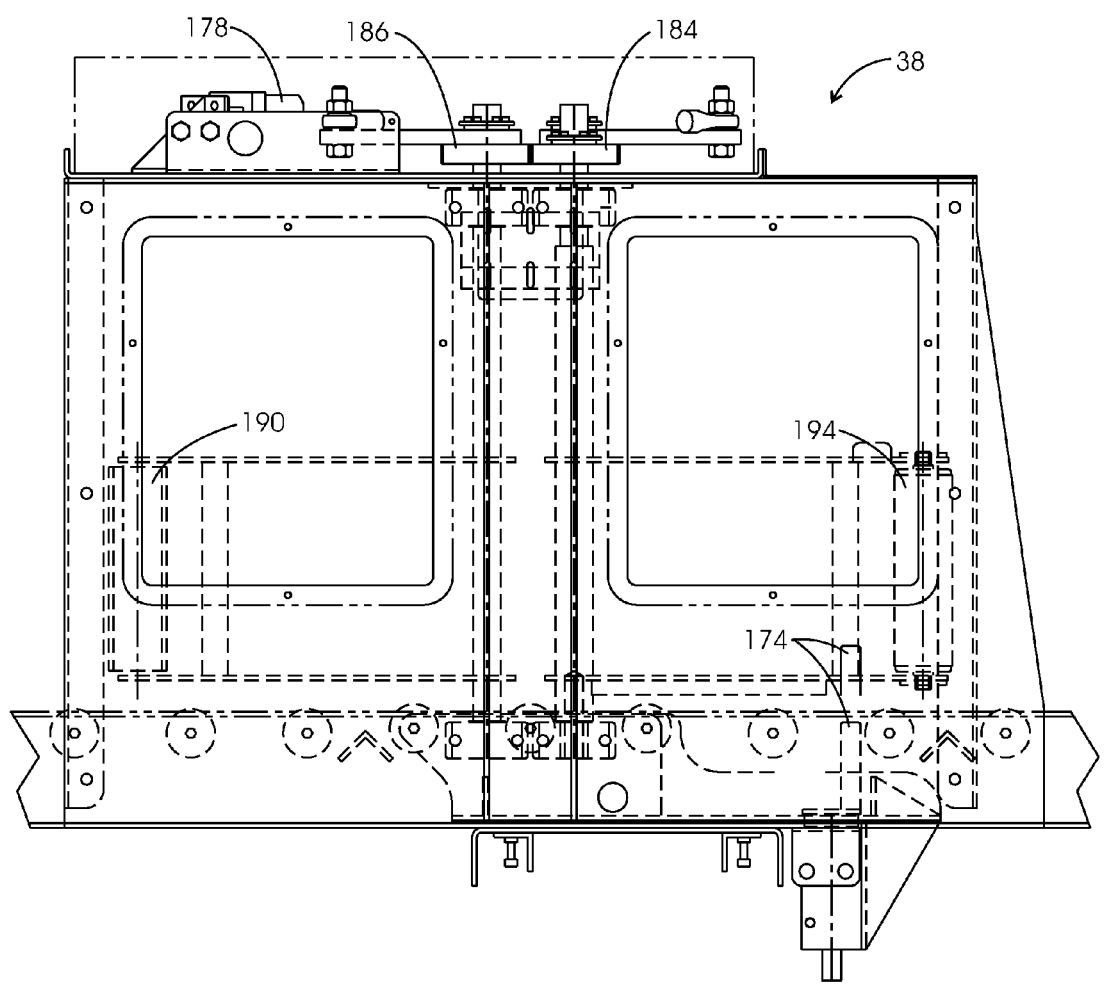
FIG. 27 is a side view of the tire rotator and bar code reader assembly of FIG. 26.
Figure 28:
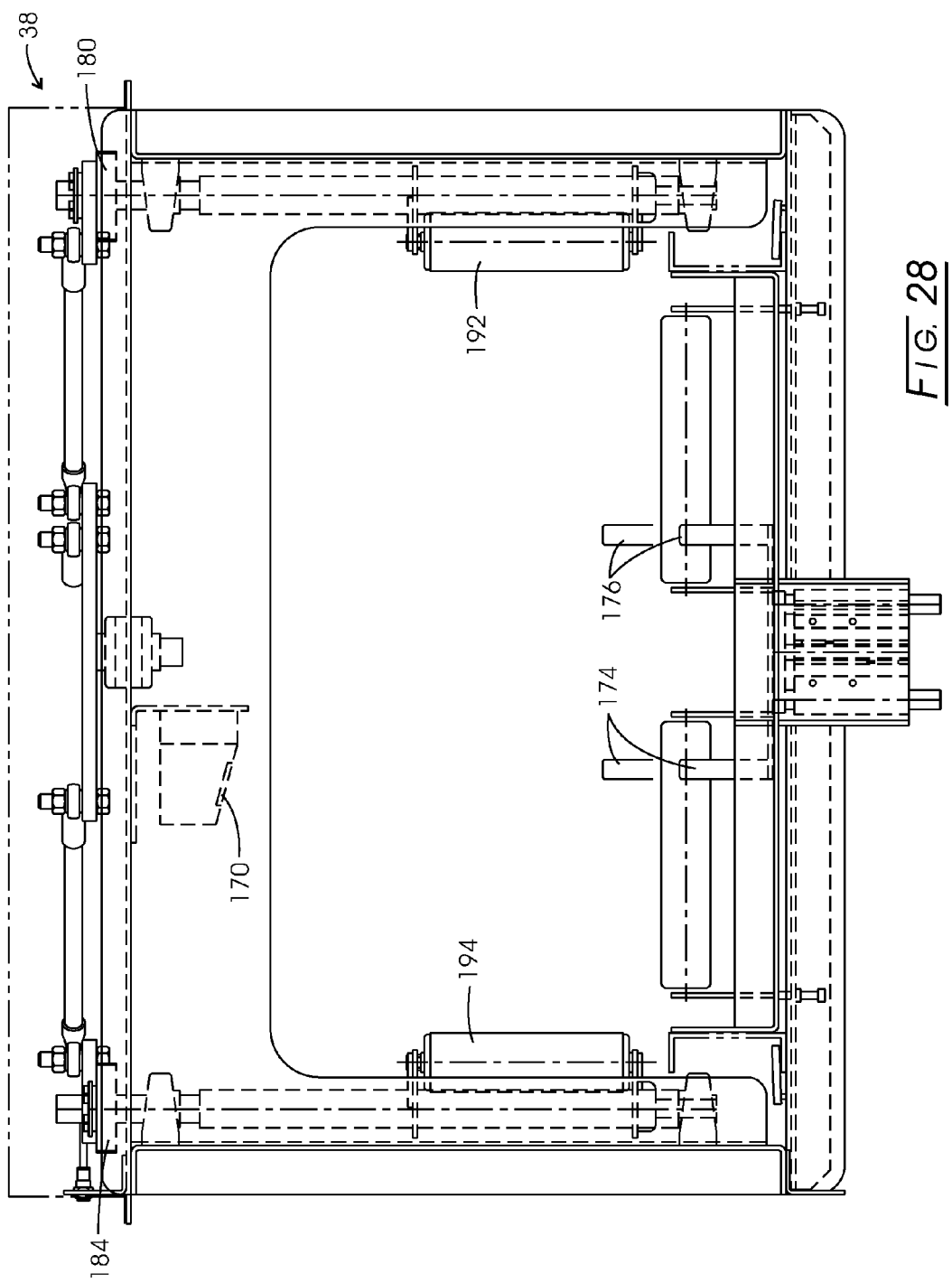
FIG. 28 an end view of the tire rotator and bar code reader assembly of FIG. 26.
Figure 29:
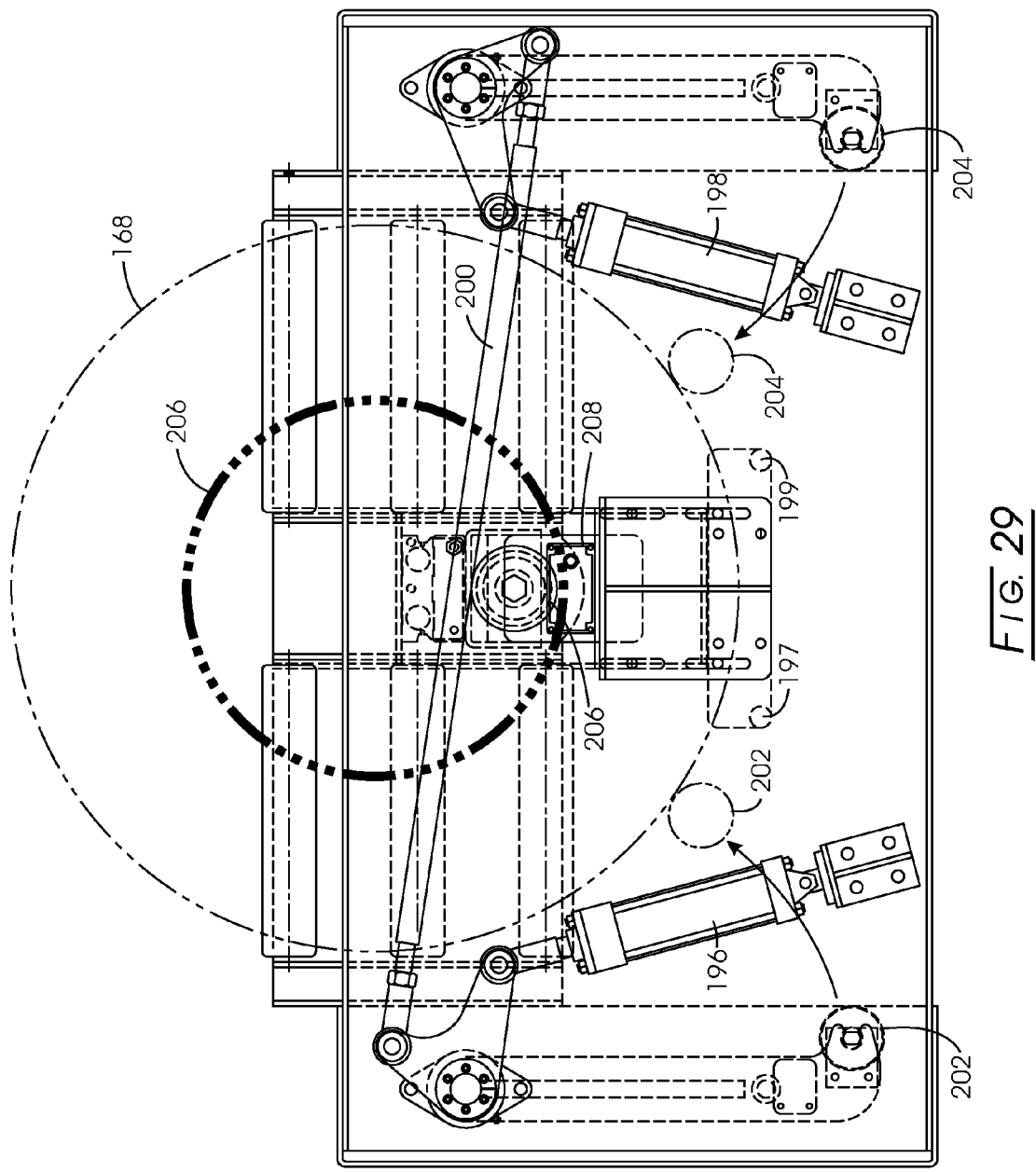
FIG. 29 is a plan view of an alternative tire rotator and bar code reader assembly design.
Figure 30:
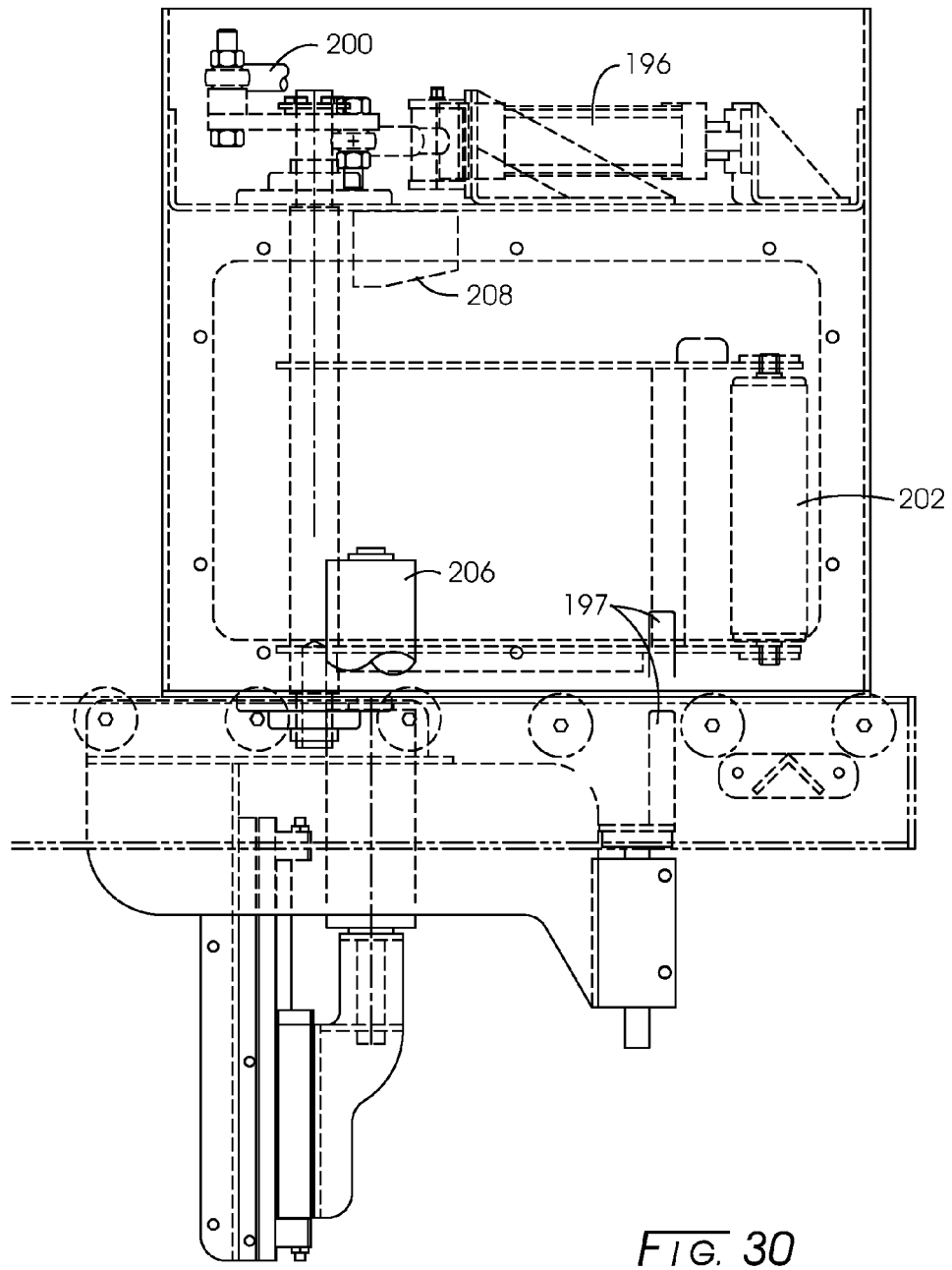
FIG. 30 is a side view of the alternative tire rotator and bar code reader assembly design of FIG. 29.

Return again to FIG. 1, tire rotator and bar code reader 38 is described in greater detail in FIGS. 26-28 with an alternative design being illustrated in FIGS. 29-30. A representative tire, 168, is seen located in operative position within tire rotator and bar code reader 38 for a bar code reader assembly, 170, to read the bar code disposed along a tire bead, 172, located on tire 168. A roller conveyor formed from a plurality of rollers carriers tire 168 into reader assembly 38 where a pair of pneumatic powered stops, 174 and 176 (see FIGS. 27 and 28 in particular) raise up and stop tire 168. A cylinder assembly, 178, is connected to rotatable assemblies, 180, 182, 184, and 186, which causes rollers, 188, 190, 192, and 194 (see, for example, FIG. 29), to pivot inwardly up and against tire 168. Each of rollers 188, 190, 192, and 194 also are powered to rotate, thus causing tire 168 to also rotate. From FIG. 27, it will be seen that conveyor 26 rollers at this junction also are slightly higher in elevation than the rollers upstream and downstream of this captured position for tire 168 and split to permit the tire to rotate. Such tire rotation moves bead 172 underneath and across reader 170 to permit the bar code to be read. Once the bar code has been read, rollers 188, 190, 192, and 194 rotate outwardly back to their home position, which releases tire 168, which by gravity continues its travel downwardly along roller conveyor 26 to the next operation.

FIGS. 29 and 30 illustrate an alternative embodiment of a tire rotator and bar code reader assembly. In particular, tire 168 moves atop slightly raised and split rollers, as before, and into contact with a pair of raised stops, 197 and 199, also as before. A pair of piston assemblies, 196 and 198, are interconnected via a rod, 200, to rotate a pair of rollers, 202 and 204, from a home position spaced apart from tire 168 to a position in contact with tire 168 and into intimate contact with a third roller, 206. Rollers 202 and 204 also rotate to cause tire 168 to also rotate with the bead, 206, disposed beneath a bar code reader, 208. Once the bar code has been read, the stop pins lower, the rotating rollers retract, and tire 168 moves down the roller conveyor to the next operation.

Figure 31:
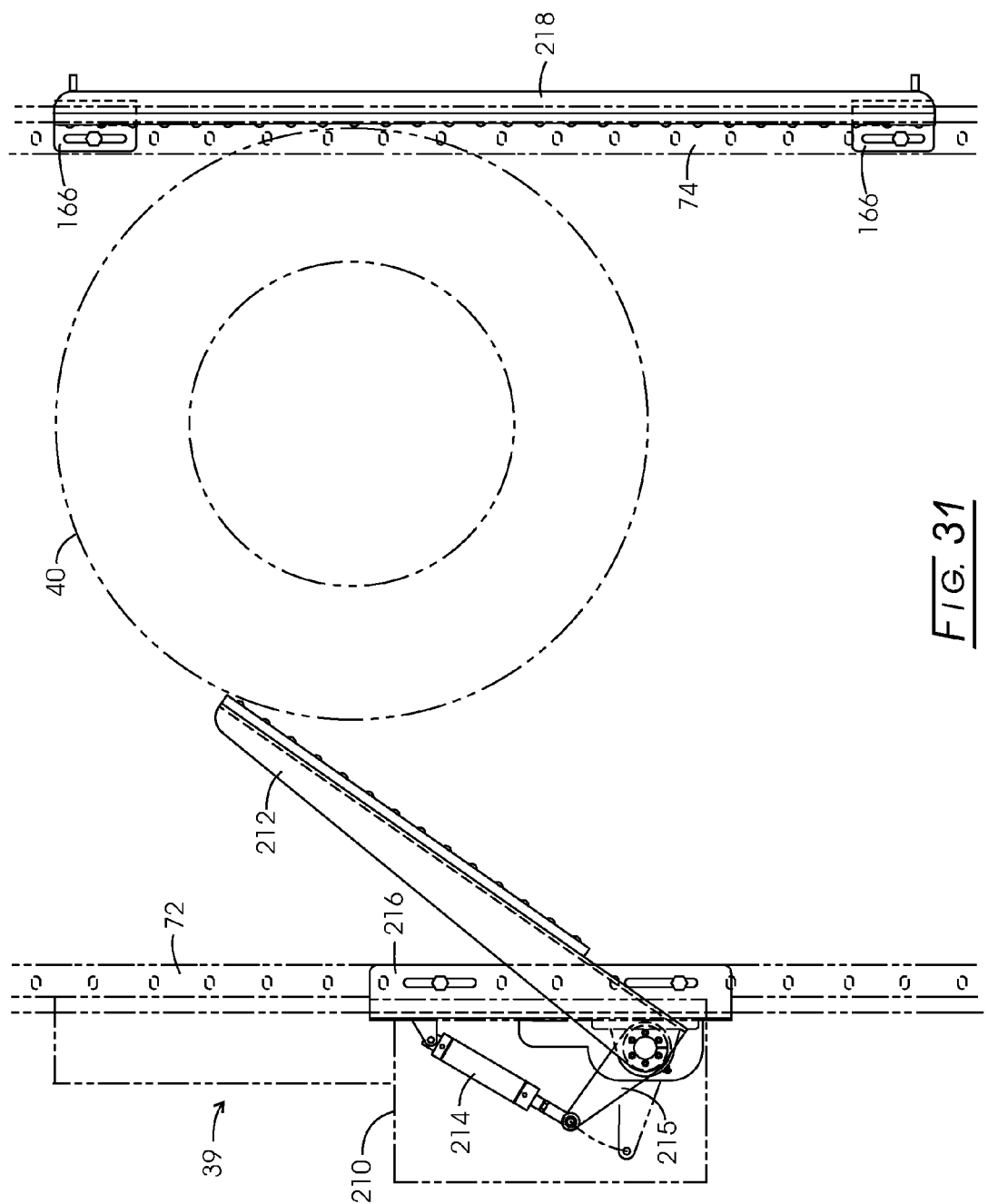
FIG. 31 is a plan view of the stager assembly shown in FIG. 1.
Figure 32:
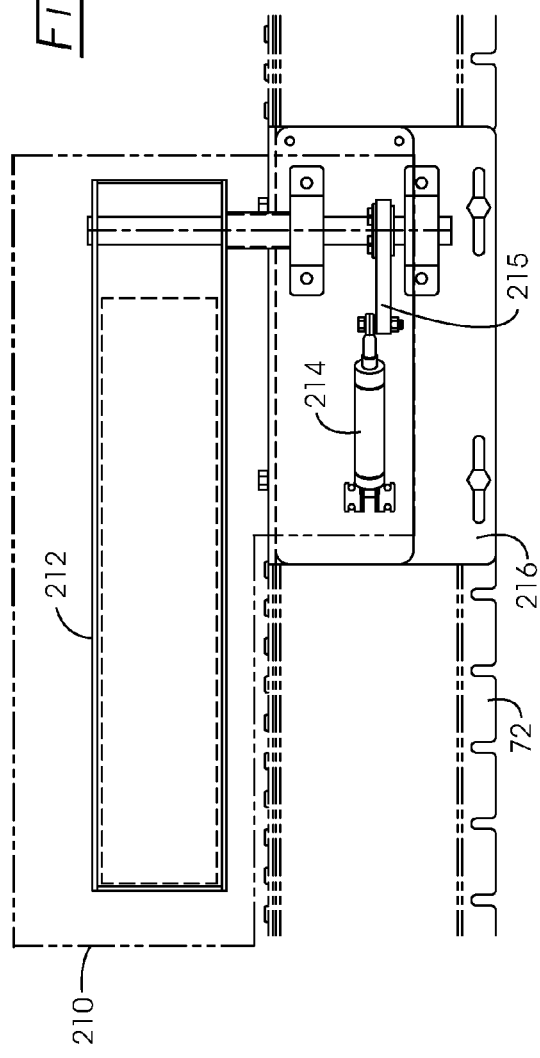
FIG. 32 is a side view of the stager assembly of FIG. 31.
Figure 33:
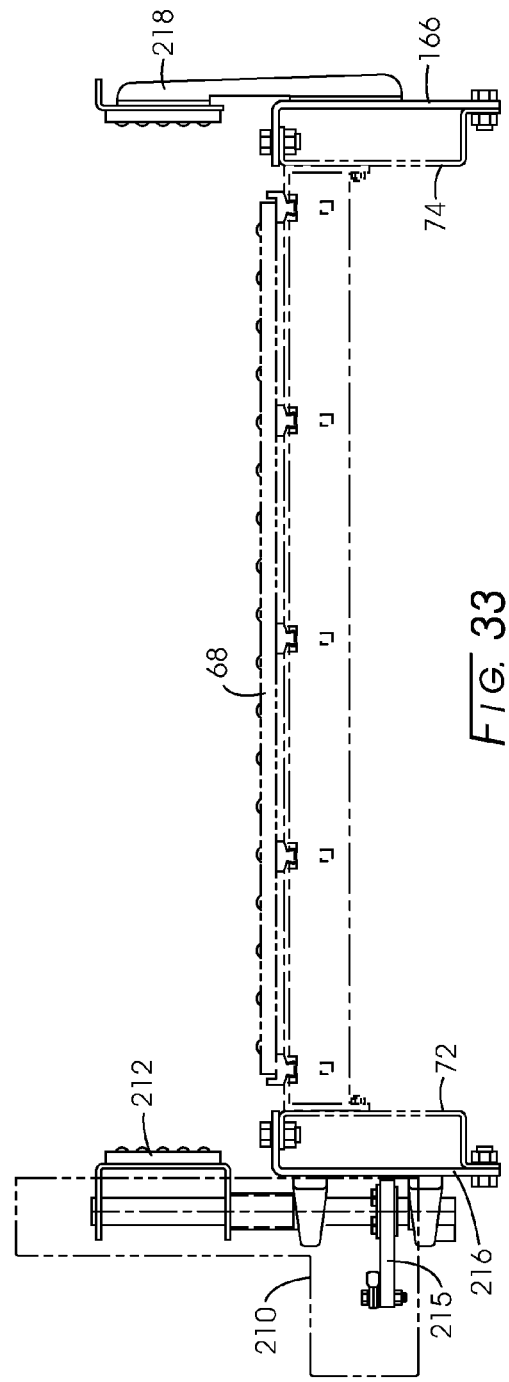
FIG. 33 is an end view of the stager assembly of FIG. 31.

Referring again to FIG. 1, tire 40 next encounters stager 39, which is illustrated in greater detail in FIGS. 31-33. A housing, 210 (shown in phantom), protects stager 39 during plant operation. A paddle, 212, again has a series of rollers along its face that confronts and contacts tire 40. In this embodiment a piston assembly, 214, is affixed a moveable swing arm, 215, which is connected to side rail 72 by a bracket, 216, which again can be located at any location along the extent of rail 72 (or rail 74, if desired or required) and can be easily and readily re-located should such relocation be necessary, desirable, or convenient.

Figure 43:
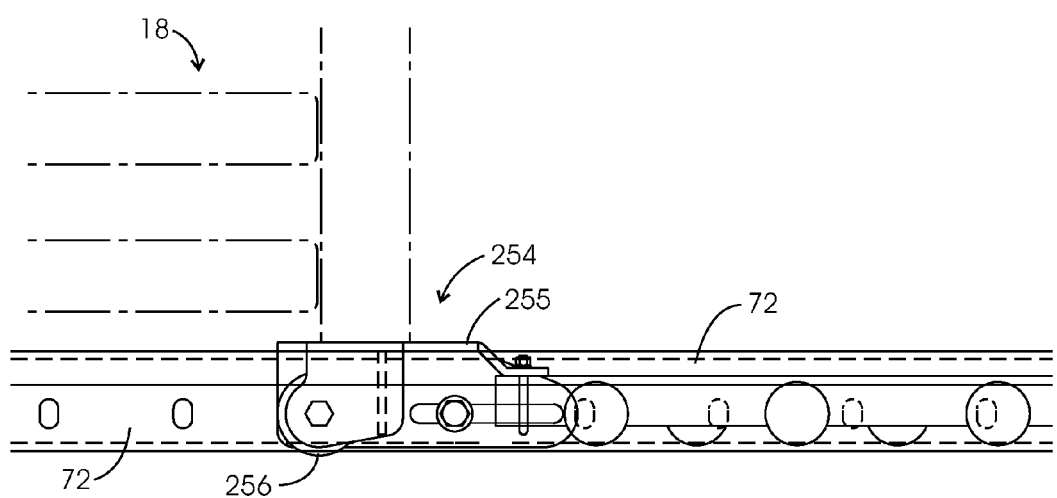
FIG. 43 is a plan view of the corner roller assembly shown in FIG. 1.
Figure 44:
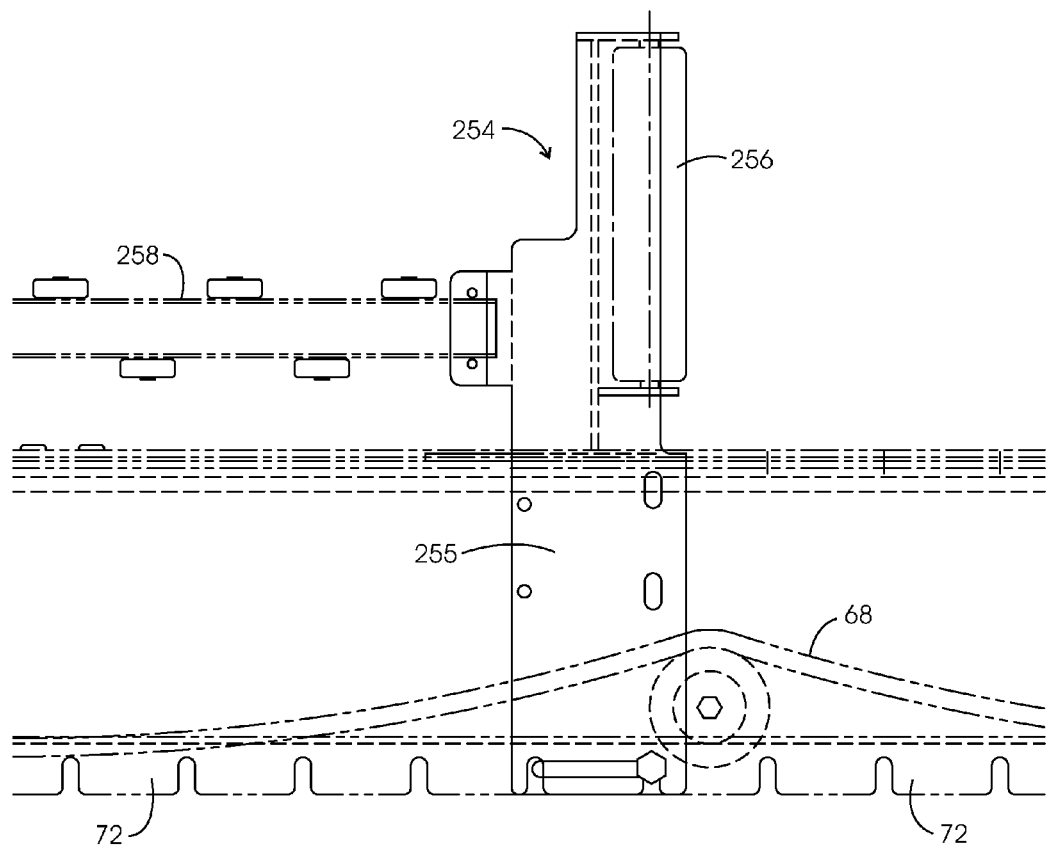
FIG. 44 is a side elevational view of the corner roller assembly of FIG. 43.

In action, piston assembly 214 retracts to rotate swing arm 215 which in turn causes swing arm or paddle 212 to rotate and push tire 40 up against far side rail 74. Side rail 74 has been fitted to a roller assembly, 218, connected to rail 74 by universal bracket 166 (see FIG. 25). Roller assembly 218 consists of an upstanding bracket portion carrying a series of rollers (described in more detail below in connection with FIGS. 43 and 44) disposed at a vertical elevation for being contacted by tire 40 to facilitate tire 40's movement as it is carried by belt 68.

Figure 36:
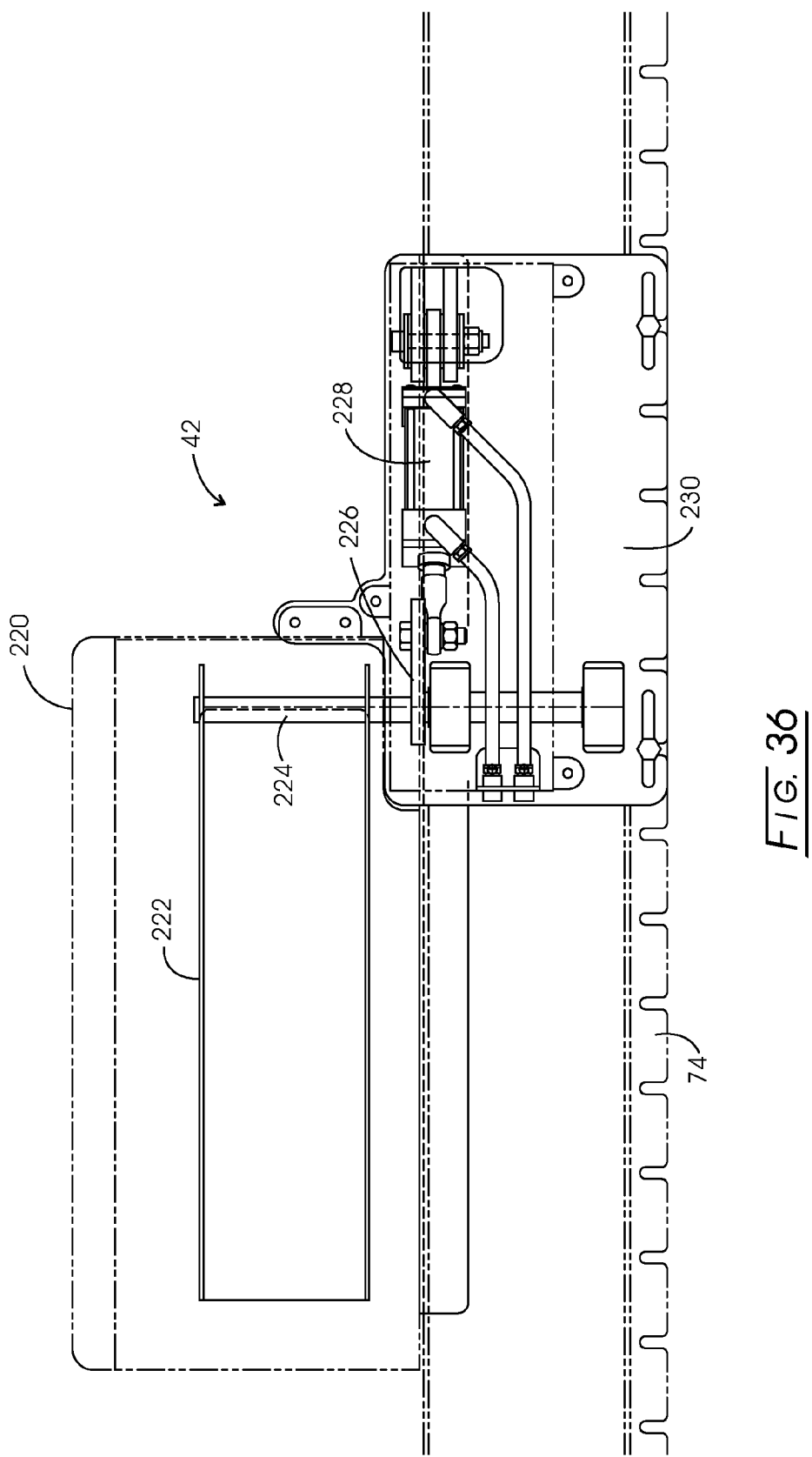
FIG. 36 is side view of the first diverter assembly shown in FIG. 1.

Tire 50 has been moved against side rail 74 in order for it to be in proper position for being contacted by diverter 42 or by diverter 44 or by diverter 46. Referring initially to FIGS. 34-36 that illustrate diverter 42 in greater detail, diverter 42 is disposed within a housing, 220, for its protection and for the protection of workers passing by. Diverter 42 includes a paddle arm, 222, carried by an upstanding rotatable pin, 224, that is pivotally connected to a pivot arm, 226, that in turn is pivotally connected to a piston assembly, 228, that in turn is connected to side rail 74, by a bracket assembly, 230. The pivot connection pivot arm 226 and the rod of piston assembly 228 is fitted with an elastomeric grommet, 229, for absorbing any force transmitted back through paddle 222 when a tire is contacted.

As before, the design of side rail 74 permits bracket assembly 230 to be located at any point along the lengthwise extent of side rail 74 initially and to be relocated to any other position along side rail 74 (or side rail 72 for that matter) readily and quickly by plant personnel. Paddle 22 rotates when piston 228 extends or pushes outwardly on arm 226. Tire 40 was pushed up against rail 74 so that tire 50 is in physical contact with arm 222 when arm 222 is activated to push tire onto side conveyor assembly 14. If tire 50 were not in physical contact with arm 222 when activated, the force with which arm 222 would hit tire 50 would likely result in arm 222 being broken or damage. Thus, the purpose for stager 39 is revealed.

Tire 52 has been shown diverted onto conveyor assembly 16 by diverter 44. While diverter 44 is different in construction that diverter 42 (and diverter 46), any one of the diverters could be substituted for another diverter as is necessary, desirable, or convenient.

Figure 39:
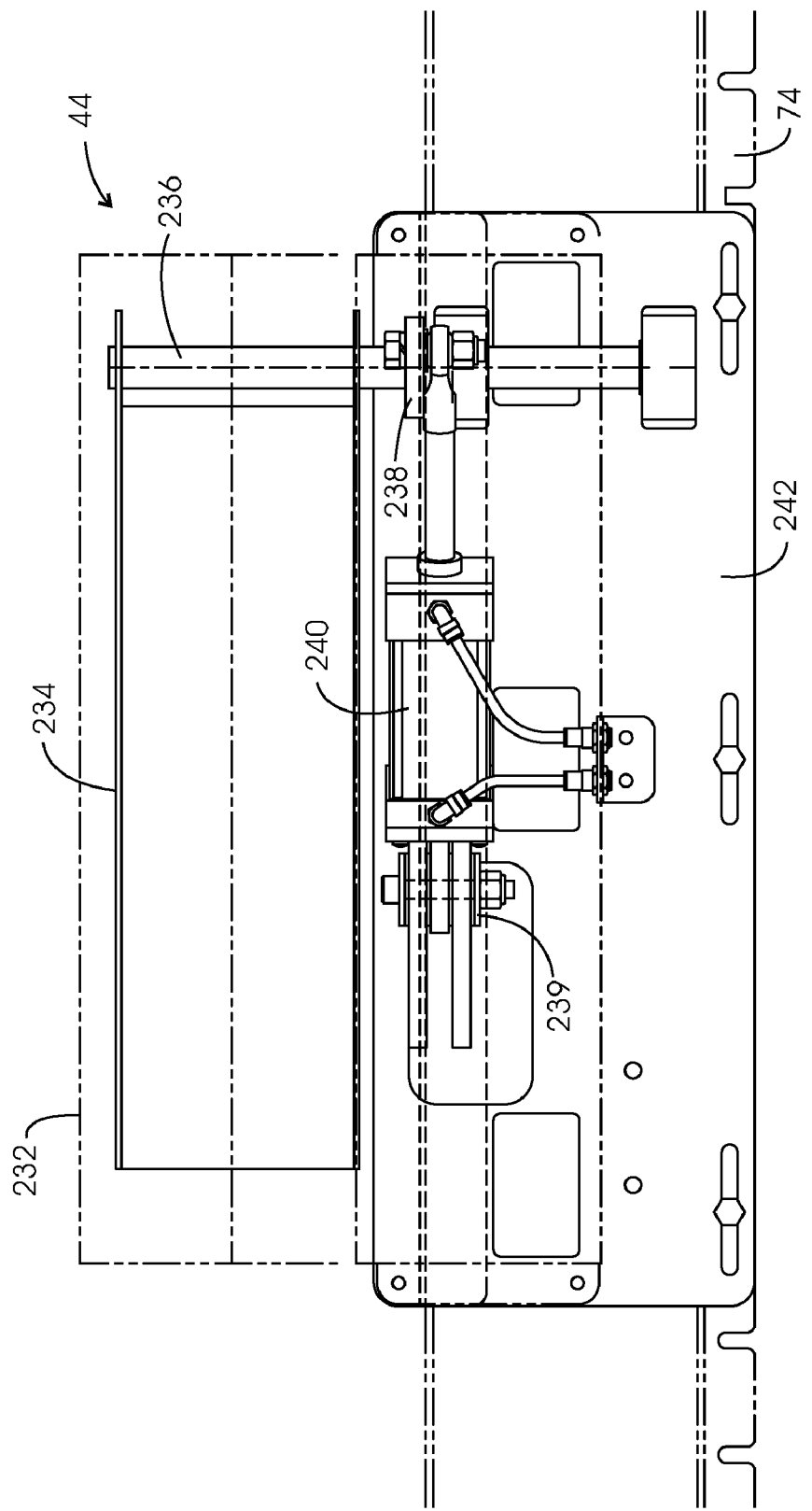
FIG. 39 is a side view of the second diverter assembly of FIG. 37.

Diverter 44 is more fully illustrated in FIGS. 37-39 and again is housed within a cover, 232. Diverter 44 includes a paddle arm, 234, connected to an upstanding pivot arm, 236, which is pivotally connected to a pivot arm, 238, which is connected to a piston assembly, 240, which is connected to side frame 74 by a bracket assembly, 242. Again, bracket assembly 242 has slots, which along with the slots in side frame 74, permit adjustment of bracket assembly 242, locating of bracket 242 anywhere along side frame 74, and movement readily and easily to a new location along either side frame 74 or side frame 72. The pivot connection pivot arm 238 and the rod of piston assembly 240 is fitted with an elastomeric grommet, 239, for absorbing any force transmitted back through paddle 234 when a tire is contacted.

Diverter assembly 44 pulls to cause rotation of paddle arm 234 by retraction of piston assembly 240. Because of this design, diverter assembly 44 takes up less space along the extent of side frame 74 than does the design of diverter assembly 42, described above.

Figure 42:
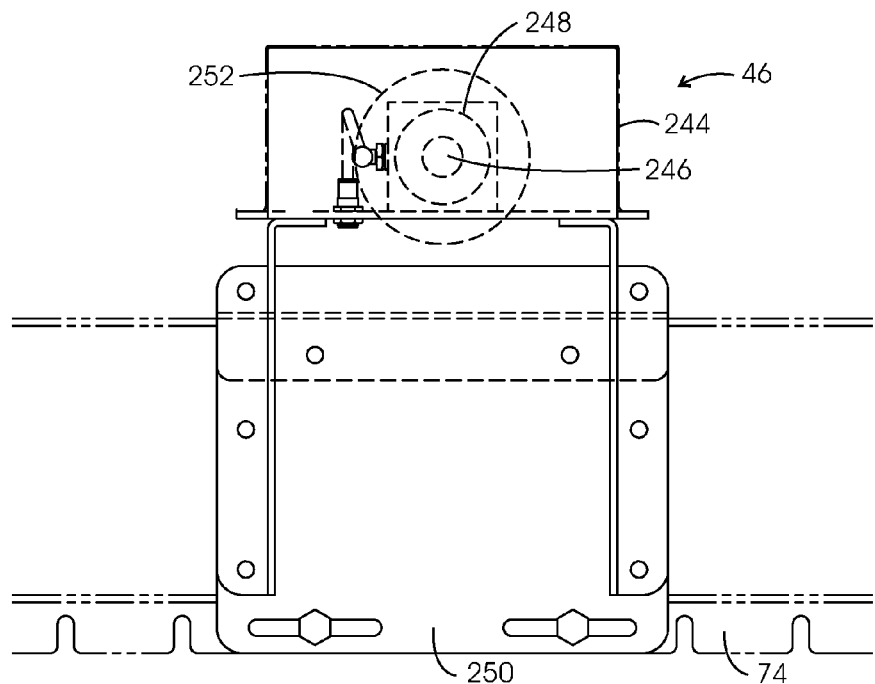
FIG. 42 is a side elevational view of the third diverter assembly of FIG. 40.

Referring back to FIG. 1 yet again, tire 56 has been pushed onto side conveyor assembly 18 by diverter 46. Diverter 46 is illustrated in greater detail in FIGS. 40-42. Diverter 46 is located within a housing, 244. Diverter 46 includes a pushrod assembly, 246, that can be the rod of a piston assembly, 248. A bracket assembly, 250, secures piston assembly 248 to side frame 74. A push plate, 252, terminates pushrod assembly 246 and physically pushes against a tire to change the tires direction by 90° from belt 68 onto side conveyor assembly 18. Again, bracket assembly 250 has slots, which along with the slots in side frame 74, permit adjustment of bracket assembly 250, locating of bracket 250 anywhere along side frame 74, and movement readily and easily to a new location along either side frame 74 or side frame 72.

When tire 56 is contacted by pushplate 252, it is possible that tire 56 may carry some forward momentum due to the movement of belt 68. In order to accommodate for this forward momentum, a roller assembly, 254 (see FIGS. 43 and 44), is provided at the upstream juncture belt 68 and side conveyor assembly 18.

Roller assembly 254 is attached to side frame 72 by a bracket assembly, 255, and carries an upstanding roller, 256, that urges tire 56 onto side conveyor assembly 18 and dampens any forward momentum of tire 56. Side frame 72 also is seen to bear a roller assembly, 258, thereabove, as illustrated earlier.

Finally, any tires traveling along belt 68 that have not already been diverted reach the termination of belt 68. For example and referring again to FIG. 1, a tire, 58, contacts diverter 48, which can simply be two upstanding plates whose faces bear a series of small rollers. Diverter 48 urges tire 58 onto final side assembly 20.

Referring an ultimate time to FIG. 1, side conveyor system 14 is fitted with an escapement or accumulator apparatus, 260, which is not unlike centering apparatus 36. Escapement apparatus 260, however, does not merely center tires, but acts as a gate to feed tires forward to operation assembly 60 at a pre-determined rate and/or when operation assembly 60 is ready for a next tire to process. To that end, the cylinder assemblies that control the paddles that retain the tires in escapement 260 actuate to pass a tire through based on a control signal.

Finally, it should be pointed out that the sequence of centering units, bar code readers, stagers, diverters, and the like, can be different in number and location from that illustrated in the drawings. In particular, such units can be used in a different order, in series or parallel, or the like, depending upon the needs of the plant and operations required.

While the assembly and components thereof has been described with reference to various embodiments, those skilled in the art will understand that various changes may be made and equivalents may be substituted for elements thereof without departing from the scope and essence of the disclosure. Additionally, many modifications may be made to adapt a particular situation or material to the teachings of the disclosure without departing from the essential scope thereof. Therefore, it is intended that the disclosure may not be limited to the particular embodiments disclosed, but that the disclosure will include all embodiments falling within the scope of the appended claims. In this application the US measurement system is used, unless otherwise expressly indicated. Also, all citations referred to herein are expressly incorporated herein by reference.

We claim:

1. A drive roller assembly for engaging a conveyor belt for movement of a conveyor belt, which comprises:
   I. a sandwich assembly of components which comprises:
      (a) said pair of outer annular scalloped wheels for engaging a conveyor belt for movement of said conveyor belt;
      (b) a pair of inner annular apertured plates having a series of cup retaining recesses disposed about said annulus;
      (c) an annular central split drive wheel; and
      (d) a rectilinear central drive nut disposed within the annulus of said sandwich assembly;
   II. a rectilinear drive shaft running through said drive nut;
   III. a series of drive cups disposed within said cup retaining recesses of said inner annular apertured plates and held in place by scallops of said outer annular scalloped wheels; and
   IV. bolt assemblies to hold said sandwich assembly together.

2. The drive roller assembly of claim 1, wherein said rectilinear drive shaft is connected to a motor assembly.

3. The drive roller assembly of claim 1, wherein a pair of clips are affixed to said rectilinear drive shaft adjacent to said drive roller assembly to hold said drive roller assembly in place on said rectilinear drive shaft.

4. The drive roller assembly of claim 1, wherein said outer annular scalloped wheels are adapted to engage a conveyor belt for movement of said conveyor belt.

5. The drive roller assembly of claim 1, wherein additional floating rollers are carried by said rectilinear drive shaft.

* * * * *